(12) United States Patent
Mladin et al.

(10) Patent No.: US 11,792,090 B2
(45) Date of Patent: Oct. 17, 2023

(54) SERVICE LAYER SUPPORT FOR MULTIPLE INTERFACE NODES

(71) Applicant: CONVIDA WIRELESS, LLC, Wilmington, DE (US)

(72) Inventors: Catalina Mihaela Mladin, Hatboro, PA (US); Dale N. Seed, Allentown, PA (US); Rocco Di Girolamo, Laval (CA); Gregory S. Sternberg, Mount Laurel, NJ (US); William Robert Flynn, IV, Schwenksville, PA (US); Shamim Akbar Rahman, Cote St. Luc (CA); Quang Ly, North Wales, PA (US); Zhuo Chen, Claymont, DE (US)

(73) Assignee: Convida Wireless, LLC, Wilmington, DE (US)

( * ) Notice: Subject to any disclaimer, the term of this patent is extended or adjusted under 35 U.S.C. 154(b) by 500 days.

(21) Appl. No.: 16/334,568

(22) PCT Filed: Sep. 20, 2017

(86) PCT No.: PCT/US2017/052474
§ 371 (c)(1),
(2) Date: Mar. 19, 2019

(87) PCT Pub. No.: WO2018/057601
PCT Pub. Date: Mar. 29, 2018

(65) Prior Publication Data
US 2021/0288892 A1    Sep. 16, 2021

Related U.S. Application Data

(60) Provisional application No. 62/397,179, filed on Sep. 20, 2016.

(51) Int. Cl.
*H04L 41/5054* (2022.01)
*H04L 61/4511* (2022.01)
(Continued)

(52) U.S. Cl.
CPC ...... *H04L 41/5054* (2013.01); *H04L 41/5019* (2013.01); *H04L 47/20* (2013.01); *H04L 61/4511* (2022.05)

(58) Field of Classification Search
CPC . H04L 41/5054; H04L 41/5019; H04L 47/20; H04L 61/1511; H04L 61/4511
See application file for complete search history.

(56) References Cited

U.S. PATENT DOCUMENTS

2006/0084417 A1* 4/2006 Melpignano ............ H04L 69/16
                                                             455/418
2007/0297378 A1* 12/2007 Poyhonen ............. H04W 48/18
                                                             370/338
(Continued)

FOREIGN PATENT DOCUMENTS

EP        3032849 A1    6/2016
WO    2015/116681 A1    8/2015
(Continued)

OTHER PUBLICATIONS

Wasserman et al., "Current Practices for Multiple-Interface Hosts" Internet Engineering Task Force (IETF) RFC: 6419, Nov. 2011, 21 pages.

(Continued)

*Primary Examiner* — Andrew C Georgandellis
(74) *Attorney, Agent, or Firm* — BakerHostetler

(57) ABSTRACT

A set of point-of-contact information including a service level identifier, an address, a list of interfaces, and a set of interface selection preferences for each of several entities may be used to facilitate communications among the entities by selecting a preferred interface in accordance with the set.

(Continued)

Interface preferences may also be derived from a set of policies. The preferred interface may be resolved in accordance with the preferences of multiple entities. Messages may include an interface type parameter to be used for forwarding of the message, and message forwarding may be resolved in accordance with the parameter and the messages.

18 Claims, 28 Drawing Sheets

(51) Int. Cl.
*H04L 41/5019* (2022.01)
*H04L 47/20* (2022.01)

(56) References Cited

U.S. PATENT DOCUMENTS

| | | | | |
|---|---|---|---|---|
| 2008/0095120 | A1* | 4/2008 | Hong | H04W 36/24 |
| | | | | 370/332 |
| 2008/0152091 | A1* | 6/2008 | Kivimaki | H04Q 3/66 |
| | | | | 379/45 |
| 2009/0010269 | A1* | 1/2009 | Larsson | H04W 40/00 |
| | | | | 370/400 |
| 2011/0140846 | A1* | 6/2011 | Blanz | H04W 4/70 |
| | | | | 340/7.1 |
| 2013/0322347 | A1* | 12/2013 | Alex | H04W 72/1215 |
| | | | | 370/329 |
| 2015/0055557 | A1 | 2/2015 | Dong et al. | |
| 2017/0091713 | A1* | 3/2017 | Paris | G06Q 10/1093 |

FOREIGN PATENT DOCUMENTS

| | | |
|---|---|---|
| WO | 2016/050865 A1 | 4/2016 |
| WO | 2016/089854 A1 | 6/2016 |

OTHER PUBLICATIONS

Stenberg et al., "Multiple Provisioning Domains Using Domain Name System" MIF Working Group Internet-Draft, Oct. 15, 2015, 13 pages.
Savolainen et al., "Improved Recursive DNS Server Selection for Multi-Interfaced Nodes" Internet Engineering Task Force (IETF) RFC: 6731, Dec. 2012, 29 pages.
OneM2M, "The Interoperability Enabler for the Entire M2M and IoT Ecosystem", White Paper, Jan. 2015, 14 pages.
OneM2M Technical Specification TS-0004 V2.7.1 "Service Layer Core Protocol Specification" Aug. 30, 2016, 331 pages.
OneM2M Technical Specification TS-0001-V2.10.0 "Functional Architecture" Aug. 30, 2016, 427 pages.
Loughney, et al., "IPv6 Node Requirements" Network Working Group, Request for Comments: 4294, Apr. 2006, 20 pages.
Krishnan et al., "Identification of Provisioning Domains" mif Working Group—Internet-Draft, Oct. 19, 2015, 6 pages.
Internet Engineering Task Force "Requirements for Internet Hosts—Communication Layers" Network Working Group RFC: 1122, Oct. 1989, 116 pages.
Chown Et al., "IPv6 Home Networking Architecture Principles" Internet Engineering Task Force (IETF) RFC: 7368, Oct. 2014, 49 pages.
Blanchet et al., "Multiple Interfaces and Provisioning Domains Problem Statement", Internet Engineering Task Force (IETF) RFC: 6418, Nov. 2011, 22 pages.
Anipko "Multiple Provisioning Domain Architecture", Internet Engineering Task Force (IETF) RFC: 7556, Jun. 2015, 25 pages.
3GPP TS 24.312 V10.7.0, 3rd Generation Partnership Project; Technical Specification Group Core Network and Terminals; Access Network Discovery and Selection Function (ANDSF) Management Object (MO) Mar. 2015, 156 pages.

* cited by examiner

SERVICE LAYER SUPPORT FOR MULTIPLE INTERFACE NODES

CROSS-REFERENCE TO RELATED APPLICATIONS

This application is the National Stage of International Patent Application No. PCT/US2017/052474, filed Sep. 20, 2017, which claims the benefit of U.S. Provisional application No. 62/397,179, filed Sep. 20, 2016, the disclosure of which is incorporated herein by reference in its entirety.

BACKGROUND

Machine-to-machine (M2M) systems, also called Internet-of-Things (IoT) or web of things (WoT) systems, often incorporate multiple interconnected heterogeneous networks in which various networking protocols are used to support diverse devices, applications, and services. These protocols have different functions and features, each optimized for one situation or another. There is no one-size-fits-all solution due to the diversity of devices, applications, services, and circumstances.

Various standards and proposed protocols, such as 3GPP and oneM2M, describe methods for various entities to establish connections and communicate at various layers of operation. See, e.g.: oneM2M.org whitepaper "The Interoperability Enabler for the Entire M2M and IoT Ecosystem—Whitepaper", January 2015; oneM2M-TS-0001 oneM2M Functional Architecture-V2.6.0; oneM2M-TS-0004 oneM2M Protocol Specification-V-2.1.0; IETF RFC7556 Multiple Provisioning Domain Architecture; IETF draft Logical-interface support for Multi-access enabled IP Hosts; IETF RFC 6418 Multiple Interfaces and Provisioning Domains Problem Statement; IETF RFC6419 Current Practices for Multiple-Interface Hosts; IETF RFC6731 Improved Recursive DNS Server Selection for Multi-Interfaced Nodes; IETF RFC 7368 Home Networking Architecture Principles; IETF RFC 1122 Requirements for Internet Hosts—Communication Layers; IETF RFC 4294 IPv6 Node Requirements; IETF draft Multiple Provisioning Domains using Domain Name System; and 3GPP TS 24.312 Access Network Discovery and Selection Function (ANDSF) Management Object (MO) V d.10.

SUMMARY

Communication among devices with multiple interfaces in M2M networks may be facilitated by providing interface preferences to a common service layer (SL). The service layer may be provided with preferences such as explicit bindings between underlying networks, network interfaces, and entity addressing. Preferences may also be configured using information provided via the lower layers. Preferences may pertain to particular applications, situations, times, and combinations thereof, for example. Devices may access such preference information via to service layer resources, such as content-sharing resources. This enables consistent behavior across devices and applications using the same service layer, for example, and enables dynamic setting of preferences by the applications and the use of the preferences by intermediate nodes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE FIGURES

A more detailed understanding may be had from the following description, given by way of example in conjunction with the accompanying drawings.

DETAILED DESCRIPTION

Figure 1:
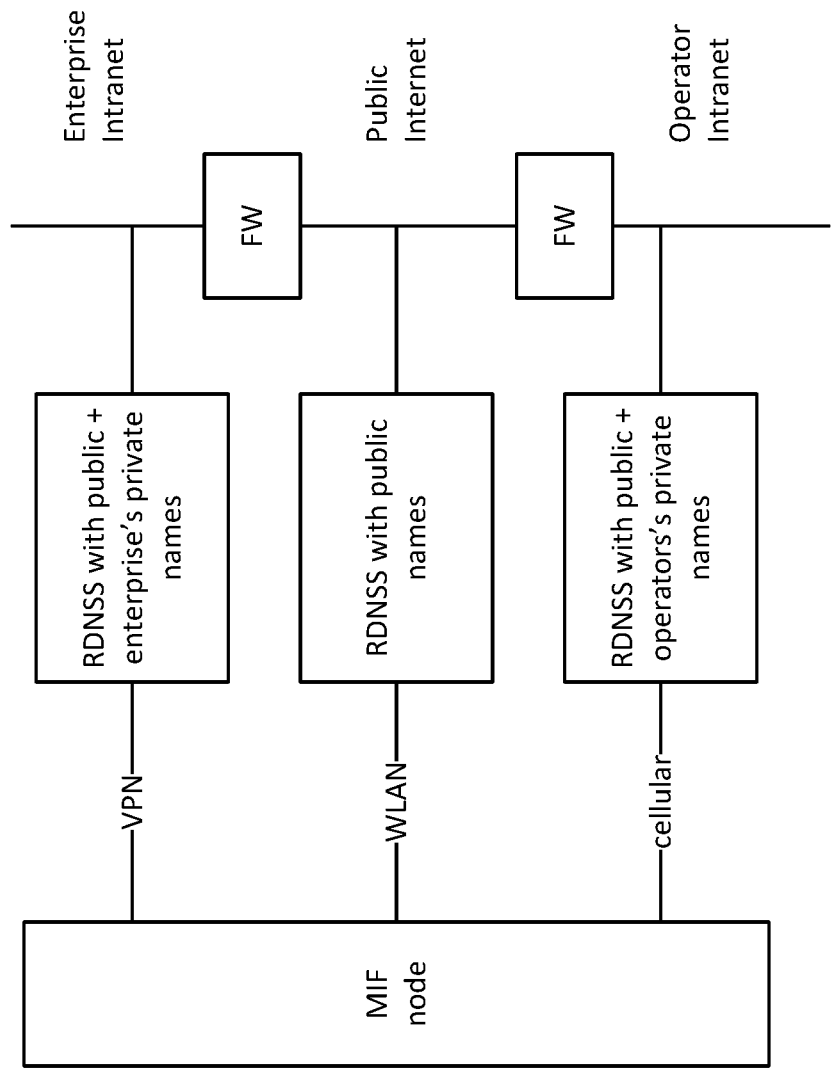
FIG. 1 illustrates an example multiple interface (MIF) node with a variety of network connection options.

Communication among devices with multiple interfaces in M2M networks may be facilitated by providing interface preferences to a common service layer (SL). The service layer may be provided with preferences such as explicit bindings between underlying networks, network interfaces, and entity addressing. Preferences may also be configured using information provided via the lower layers. Preferences may pertain to particular applications, situations, times, and combinations thereof, for example. Devices may access such preference information via to service layer resources, such as content-sharing resources.

For example, a first apparatus may manage a set of point-of-contact information of one or more entities, including a first entity residing on the first apparatus. The set of point-of-contact information may include a service level identifier, an address, a list of interfaces, and a set of interface selection preferences for each entity in the set. The first apparatus may then facilitate communications between the first entity and a second entity residing on a second apparatus by selecting a preferred interface in accordance with the set of point-of-contact information for the first entity.

The set of interface preferences, or a portion thereof, may be obtained from a user via a graphical user interface. The first apparatus may also derive a set of interface preferences associated with an entity at least in part from a set of policies. The first apparatus may further the set of point-of-contact information to the second apparatus. The first apparatus may send a message to a next hop apparatus, where the message includes an indication of a preference for interface type to be used for forwarding of the message.

The set of point-of-contact information of one or more entities may include comprise point-of-contact information for the second entity, such that the first apparatus may resolve the selection of a preferred interface in accordance with the interface selection preferences of the first entity and the second entity, whereby communications between the first entity and the second entity are facilitated according to the resolved selection.

The first apparatus may maintain a list comprising, for one or more listed interfaces, an activity status and a next hop reachable via the listed interface, and an interface scope, the interface scope comprising addresses of reachable entities associated with the listed interface. The first apparatus may use such a list in a number of ways. For example, the first apparatus may receive a message addressed for delivery to a destination address, where the message comprises a preferred interface type parameter, and then compare the destination address to the address of the first entity. If the destination address resolves to the address of the first entity, the first apparatus may select a preferred interface in accordance with the preferred interface type parameter of the message and the interface selection preferences in the set of point-of-contact information of the entity associated with the destination address.

Similarly, the first apparatus may compare the destination address to the scopes of the listed interfaces. If the destination is within the scope of one or more listed interfaces, the first apparatus may select the preferred interface in accordance with the interface selection preferences in the set of point-of-contact information of the entity associated with the destination address. If the destination is within not the scope of the one or more listed interfaces, the first apparatus may select a preferred interface in accordance with the preferred interface type parameter of the message.

Apparatuses may share such information. For example, the second apparatus may obtain the set of point-of-contact information from the first apparatus, which includes the point-of-contact information of the first entity. The second apparatus may then select a preferred interface for communications with the first entity in accordance with the set of point-of-contact information.

Such multiple interface (MIF) node technology provides additional reliability and flexibility for many M2M/IoT use cases, which in turn may lead to their wider adoption. Traditional systems, which lack MIF connection management mechanisms at the service layer, may exhibit inconsistent behavior of in the selection of an underlying network selection and simultaneous use of multiple interfaces in multiple domains. Traditional service layers rely on both IP-level addressing and SL entity addressing, and lack means for coherently binding them to the underlying network and network interfaces. MIF support at the service layer addresses these issues, among others.

TABLE 1

| | Abbreviations |
|---|---|
| ADN | Application Dedicated Node (oneM2M) |
| ADN-AE | Application Entity in an Application Dedicated Node (oneM2M) |
| AE | Application Entity (oneM2M or generic) |
| AE-ID | Application Identifier (oneM2M) |
| ANDSF | Access Network Discovery and Selection Function (3GPP) |
| API | Application Program Interface |
| ASN | Application Service Node (oneM2M) |
| ASN-AE | AE which resides in an Application Service Node (oneM2M) |
| ASN-CSE | CSE which resides in an Application Service Node (oneM2M) |
| CMDH | Communication Management and Delivery Handling |
| CSE | Common Services Entity (oneM2M) |
| CSE-ID | CSE Identifier (oneM2M) |
| CSF | Common Services Function (oneM2M) |
| DNS | Domain Name Server |
| DNSSES | DNS Security |
| DHCP | Dynamic Host Configuration Protocol |
| FQDN | Fully Qualified Domain Name |
| HTTP | Hypertext Transfer Protocol |
| IETF | Internet Engineering Task Force |
| IF | Interface |
| IMF | Interface Management Function |
| IN | Infrastructure Node |
| IN-AE | AE which resides in the Infrastructure Node (oneM2M) |
| IN-CSE | CSE which resides in the Infrastructure Node (oneM2M) |
| LAN | Local Area Network |
| LIF | Logical Interface |
| M2M | Machine to Machine |
| MIF | Multiple Interface |
| MN | Middle Node (oneM2M) |
| MN-AE | AE in the Middle Node (oneM2M) |
| MN-CSE | CSE in the Middle Node (oneM2M) |
| Node-ID | M2M Node Identifier (oneM2M) |
| NoDN | Non-oneM2M Node (oneM2M) |
| NSE | Network Service Entity (oneM2M) |

TABLE 1-continued

| Abbreviations | |
|---|---|
| PIF | Physical Interface |
| PvD | Provisioning Domain |
| PoA | Point of Access |
| PoC | Point of Contact |
| RDNSS | Recursive DNS Server |
| REST | REpresentational State Transfer |
| RoA | Resource-oriented Architecture |
| SDO | Standards Defining Organization |

TABLE 1-continued

| Abbreviations | |
|---|---|
| SoA | Service-oriented Architecture |
| SP | Service Provider |
| UN | Underlying Networks |
| URI | Uniform Resource Identifier |
| VPN | Virtual Private Network |
| WG | Working Group |
| WLAN | Wireless LAN |

TABLE 2

| Terminology | |
|---|---|
| Application Dedicated Node (ADN) | An Application Dedicated Node (ADN) is a node containing at least one AE and no CSEs, and communicates with a CSE residing in a MN or in an IN. For example an ADN may reside in a constrained M2M Device. |
| Application Entity (AE) | An Application Entity (AE) is an execution instance of an M2M application identified with a unique AE-ID. |
| Application Identifier | An Application Identifier uniquely identifies an M2M Application in a given context. There is a registration authority defined App-ID (registered App-ID) and non-registered App-ID. The establishment of the registered App-ID is guaranteed to be globally unique; the non-registered App ID is not guaranteed to be globally unique. |
| Application Service Node (ASN) | An Application Service Node (ASN) is an entity containing one CSE and at least one AE. Example of physical mapping is an ASN could reside in an M2M Device. |
| Common Services Entity (CSE) | A Common Services Entity (CSE) is an instantiation of a Service Layer and is identified with a unique CSE-ID. |
| Common Services Functions (CSF) | A Common Services Functions (CSF) is a service functions offered by CSEs. |
| CSE Identifier | A CSE Identifier is a globally unique identifier for a CSE, when instantiated within an M2M Node in the M2M System. When used internally within a specific M2M SP domain, it is sufficient to be unique within that M2M Service Provider domain. It is extended to become globally unique when used outside the M2M Service Provider boundaries. The CSE-ID shall identify the CSE for the purpose of all interactions from/to the CSE within the M2M System. |
| Domain Name System (DNS) | A Domain Name System (DNS) is a hierarchical decentralized naming system for computers, services, or any resource connected to the Internet or a private network. It associates various information with domain names assigned to each of the participating entities. Most prominently, it translates more readily memorized domain names to the numerical IP addresses needed for the purpose of locating and identifying computer services and devices with the underlying network protocols. |
| Fully Qualified Domain Name (FQDN) | A Fully Qualified Domain Name (FQDN) is a domain name that specifies its exact location in the tree hierarchy of the DNS. It specifies all domain levels, including the top-level domain and the root zone. |
| Infrastructure Node (IN) | An Infrastructure Node (IN) is an entity in the Infrastructure Domain containing one CSE and contains zero or more AEs. There is exactly one Infrastructure node per oneM2M Service Provider and may contain CSE functions not applicable to other node types. Example of physical mapping is an IN could reside in an M2M Service Infrastructure. |
| Interface-scoped | An Interface-scoped (e.g., parameters, configuration, etc.) are parameters specific to an interface, such as the IP address and a link prefix. A set of such parameters might form a configuration (object) PvD, etc. |
| Logical interface (LIF) | A Logical interface (LIF) is a virtual interface appearing to the IP stack like any other physical interface, and providing similar semantics in respect to packet transmit/receive functions. It is only a logical construct and not an instance of any physical hardware. |
| M2M Node Identifier | An M2M Node Identifier is a globally unique identifier for an M2M Node hosting a CSE and/or Application(s). The M2M Service Provider is allowed to set the CSE-ID and the M2M-Node-ID to the same value. The M2M-Node-ID enables the M2M Service Provider to bind a CSE-ID to a specific M2M Node. Examples of allocating a globally unique M2M-Node-ID include the use of Object Identity (OID) and IMEI. |
| Middle Node (MN) | A Middle Node (MN) is an entity containing one CSE and zero or more AEs. There may be zero or more MNs in the Field Domain of the oneM2M System. Example of physical mapping is a MN could reside in an M2M Gateway. |
| Multi-Interfaced (node) | A Multi-Interfaced (MIF) node is a node connected to multiple networks, some of which might be utilizing private namespaces, and on which communications may be simultaneous and independent. Although in the broadest sense MIF node communication includes multi-homing, IETF narrows the MIF scope to nodes configured with more than one IP address, |

TABLE 2-continued

Terminology

| | |
|---|---|
| | therefore without multi-homing support and without transport layer mobility or identifier-locator split mechanisms, as described in IETF RFC 7556 Multiple Provisioning Domain Architecture. |
| Multi-homing | Multi-homing means communication with a node via multiple networks available. Although multi-homing is available to an MIF node, what is generally meant by multi-homing implies the availability of multiple physical links via a single IP address (space) usually employed for a site and not for single hosts. |
| Node-scoped | Node-scoped parameters, configurations, etc., are global to a node, such as routing information (e.g., default gateway), DNS server IP addresses, and address selection policies. A set of such parameters might form a node-scoped configuration (object). |
| Non-oneM2M Node (NoDN) | A Non-oneM2M Node (NoDN) is a node representing devices attached to the oneM2M system for interworking purposes, without containing oneM2M Entities (neither AEs nor CSEs). |
| Physical Interface (PIF) | A Physical Interface (PIF) is a network interface module used for connecting to an access network, and which may support specific link technology. |
| Provisioning Domain | A Provisioning Domain is a consistent set of network configuration information. Classically, all the configuration information available on a single interface is provided by a single source, and may be considered therefore a single provisioning domain |
| Recursive DNS Server (RNDSS) | A Recursive DNS Server (RNDSS) is a server that provides a recursive DNS resolution service for translating domain names into IP addresses. |
| Underlying Network Services Entity | An Underlying Network Services Entity is an entity providing services from the underlying network to CSEs. |

Many devices, such as laptops and smartphones, have multiple access network interfaces. As the cost of complex communications components decreases, more devices may be provided with similar capabilities. In 2009 IETF started a Working Group (WG) dedicated to Multi-Interface Nodes (MIFs) known as the MIF-WG. Its charter is to study issues encountered by nodes attached to multiple networks, due to network configuration conflicts and/or simultaneous use of the multiple available networks. As of October 2014, IETF includes multi-homing and multi-addressing in IETF RFC 7368, IPv6 Home Networking Architecture Principles.

FIG. 1 shows a MIF node with a variety of network connection options. As described in IETF RFC6731 Improved Recursive DNS Server Selection for Multi-Interfaced Nodes, a MIF node "can be connected to one or more networks that are using private namespaces. As an example, a node can simultaneously open a Wireless LAN (WLAN) connection to the public Internet, a cellular connection to an operator network, and a Virtual Private Network (VPN) connection to an enterprise network. When an application initiates a connection establishment to a Fully Qualified Domain Name (FQDN), the node needs to be able to choose the right RDNSS for making a successful DNS query."

IETF RFC 6418, Multiple Interfaces and Provisioning Domains Problem Statement, describes MIF nodes as having the following characteristics: IPv4 and/or IPv6 compliant; configured with more than one IP address (excluding loopback and link-local), which may be from the same or from different address families, such as IPv4 and IPv6; able to attach to more than one provisioning domains, as presented to the IP stack; with virtual or physical interfaces; configuration objects come from one or more administrative domains; communications using these IP addresses may happen simultaneously and independently; some communications using these IP addresses are possible on all the provisioning domains, while some are only possible on a smaller set of the provisioning domains; and while the MIF node may forward packets between its interfaces, forwarding packets between interfaces is not taken into account in this definition.

In order for a node to be attached to multiple domains, configuration information from each domain is provided via configuration objects, each containing a set of parameters. Some of the objects may be specific to the interface (interface-scoped) while others may be global to the node (node-scoped). Interface selection issues may occur when conflicting node-scoped configuration objects are received or used incorrectly. Other issues are the result of simultaneous attachment to multiple networks, such as domain selection or addressing and naming space overlaps.

Three types of issues have been summarized by IETF RFC 6418, Multiple Interfaces and Provisioning Domains Problem Statement. First is a lack of consistent and distinctive management of configuration elements associated with different networks. Second is inappropriate mixed use of configuration elements, associated with different networks, in the course of a particular network activity/connection. Third is use of a particular network, not consistent with the intent of the scenario/involved parties, leading to connectivity failure or other undesired consequences. The IETF MIF-WG considers certain related cases out of scope. For example, when multiple interfaces to networks with disparate access technologies share a single IP address, this is considered as a single interface from the IP stack point of view. Link aggregation below the IP layer and mechanisms (e.g., based on a virtual IP interface) which allow a single interface to be exposed to the IP stack fall in this category, therefore are out of scope of this IETF work.

IETF RFC7556, Multiple Provisioning Domain Architecture, refers only to nodes implementing RFC1122, Requirements for Internet Hosts—Communication Layers, for IPv4, and to RFC4294, IPv6 Node Requirements, for IPv6, without special-purpose support for transport layers mobility, multi-homing, or identifier-locator split mechanisms.

A solution is explored in IETF RFC 6731, Improved Recursive DNS (RDNSS) Server Selection for Multi-Interfaced Nodes, which applies to the case in which the MIF receives RDNSS configuration information from all connected networks, among which some might use private DNS namespaces. Some RDNSS might have information about namespaces other servers do not have. RFC 6731 describes DHCPv4 and DHCPv6 node configuration options that may be used to perform informed RDNSS selection decisions.

As stated in RFC 6731, this improvement does not fully solve the more complex scenario of FQDNs resolving into network-interface-specific, not globally unique, IP addresses. The same FQDN might also identify completely different peers, with different services, on different network interfaces.

For the RDNSS solution to solve the problem of the FQDN for a private name, enterprise or an operator's service, network interface selection needs to be performed before destination's IP address is known.

Another complex scenario occurs when the FQDN identifies a single peer entity, but one that provides different services on its different network interfaces. DNS Security (DNSSEC) validation procedures may provide assistance for selecting correct responses, but only where a preferred trust anchor has been designated.

To address some of the issues under study, the MIF Working group has outlined a solution framework using the concept of a Provisioning Domain (PvD). PvDs are defined as a consistent set of network configuration, and are used to enable separation and configuration consistency when multiple concurrent connections are provided by a node. In the IETF vision, PvD-aware nodes learn PvD-specific information from the networks they are attached to and/or other sources.

PvD information delivery within a local area network has been included in the Home Networking IETF WG work as well, since a common scenario involves a home network with multiple physical connections to Service Providers, as described in IETF RFC 7368, Home Networking Architecture Principles. In this context, the choices for PvD information delivery information, from Service Provider to Customer Edge router and router to host, include DNS, DHCP and Route Advertisement.

PvDs may also be used for service provisioning. For example, hosts which may subscribe to two different Service Providers for internet and Internet of Things (IoT) services. Since the user may also subscribe to the same Provider for both services, PvDs may be used for customized network configuration purposes and enables independent and flexible provisioning for different services. Meanwhile, IoT service providers may also want to use independent PvDs to avoid the configuration conflicts between each other, as described in IETF RFC 6418, Multiple Interfaces and Provisioning Domains Problem Statement.

While for external interfaces, the PvD information may be provided by the corresponding SPs, interior interfaces PvD information may be relayed from the external interfaces, or may be created based on available information. Since the end nodes/hosts in home networks are expected to be multi-interfaced as well, PvD may also be used in such cases to associate different network configurations.

IETF RFC 7556, Multiple Provisioning Domain Architecture, describes different levels of PvD support. At the "Basic level", applications are not PvD aware in any manner and only submit connection requests. PvD selection is performed implicitly by the node. Selection methods are mainly based on administrative policies which are node-specific. User choices may be considered when provided through a user interface provided by the node/operating environment, not by the application.

At the "Intermediate level" PvD selection includes hard requirements and soft preferences from applications. Some/all properties of the resultant PvD may be exposed to applications.

At the "Advanced level" the applications participate in the enumeration and selection of PvDs. Implementation may impose restrictions, e.g., via by node policy and/or user choice, such as limiting which configurations may or may not be visible to the application, or override the applications' preferences.

To date the information provided by PvDs has not been standardized. Challenges include configurations that are specific to an interface, such as the IP address and the link prefix. Others, such as the routing information for a default gateway, DNS server IP addresses, and address selection policies, are typically implemented as node-scoped, i.e. applied globally to the node. When the configurations have different node-scoped values, e.g., from different provisioning domains, the conflicts need to be resolved by either making a choice between configurations or merging them.

Management of connectivity in environments with multiple interfaces may be handled by the OSs, e.g., Android, of some devices, such as mobile handsets, via non-standardized methods, by mechanisms or applications known as connection managers, as described in IETF RFC 6419, Current Practices for Multiple-Interface Hosts.

Connection managers rely on policy servers to provision rules on how the network selection should be provided. Some networks have standardized the policy formats and the methods they use within the network, resulting in preferences to be used for routing purposes, but these pertain only to a limited set of networks. See, e.g., 3GPP TS 24.312 Access Network Discovery and Selection Function (ANDSF) Management Object (MO).

With proprietary solutions, routing and network selection still present problems in ensuring coherent behavior. Different platforms will behave differently when connected to the same network, even when using the same type of interface and for the same purpose. The IETF PvD architectural framework is aimed at improving device behavior by providing consistent tools and guidance for network selection decisions, as described in RFC7556.

Figure 2:
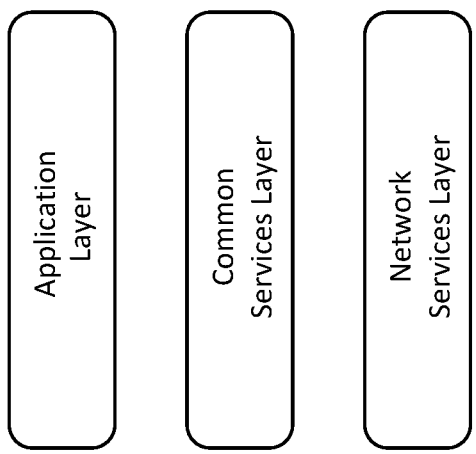
FIG. 2 illustrates a common services layer (SL) between an applications layer and the network services layer with communication HW/SW that provides data transport.

In recent years solutions targeting machine to machine (M2M) communications have been developed for many business sectors, and this has led to efforts in integrating functionality from different sectors on the same platforms. A standardization effort aimed at horizontal platforms for the exchange and the sharing of data among applications, independent of industry sectors, has been initiated by oneM2M. The Interoperability Enabler for the Entire M2M and IoT Ecosystem—Whitepaper of January 2015 states that "oneM2M is creating a distributed software layer—like an operating system—which is facilitating that unification by providing a framework for interworking with different technologies." A common Services Layer ("Service Layer", SL) implementing this distributed software layer sits between the M2M applications and the communication HW/SW that provides data transport, as shown in FIG. 2. See, e.g., oneM2M-TS-0001 oneM2M Functional Architecture-V2.6.0. The service layer may be a functional layer within a network service architecture. Service layers are typically situated above the application protocol layer such as HTTP, CoAP or MQTT and provide value added services to client applications. The service layer also provides an interface to core networks at a lower resource layer, such as for example, a control layer and transport/access layer. The service layer supports multiple categories of (service) capabilities or functionalities including a service definition, service runtime enablement, policy management, access control, and service clustering. Recently, several industry standards bodies, e.g., oneM2M, have been developing M2M service layers to address the challenges associated with the integration of M2M types of devices and applications into deployments such as the Internet/Web, cellular, enterprise, and home networks. A M2M service layer can provide applications and/or various devices with access to a collection of or a set of the above mentioned capabilities or functionalities, supported by the service layer, which can be referred to as a CSE or SCL. A few examples include but are not limited to security, charging, data management, device management, discovery, provisioning, and connectivity management which can be commonly used by various applications. These capabilities or functionalities are made available to such various applications via APIs which make use of message formats, resource structures and resource representations defined by the M2M service layer. The CSE or SCL is a functional entity that may be implemented by hardware and/or software and that provides (service) capabilities or functionalities exposed to various applications and/or devices (i.e., functional interfaces between such functional entities) in order for them to use such capabilities or functionalities.

From a functional perspective, the oneM2M architecture identifies three main functional entities: AEs, CSEs, and NSEs. These functional entities reside on Nodes, which are logical entities individually identifiable in the oneM2M System, roughly equivalent to devices. From the Service Layer perspective, Nodes are either CSE-Capable or Non-CSE-Capable. One example of a CSE-Capable node is an Application Service Node (ASN), e.g., an M2M device, containing an ASN-CSE and at least one ASN-AE and communicating with one other node. Another example is a Middle Node (MN), e.g., a gateway, containing an MN-CSE and at least one MN-AE, and communicating with two other nodes. Yet another example is an Infrastructure Node (IN), e.g., an M2M Service infrastructure, containing an IN-CSE and several IN-AEs, communicating with all SP nodes.

An example of a Non-CSE-Capable Node is an Application Dedicated Node (and), e.g., a constrained M2M device, containing at least one ADN-AE and no CSEs, communicating with one other node. Another example is a Non-oneM2M Node (NoDN), representing interworked devices without AEs or CSEs.

Figure 3:
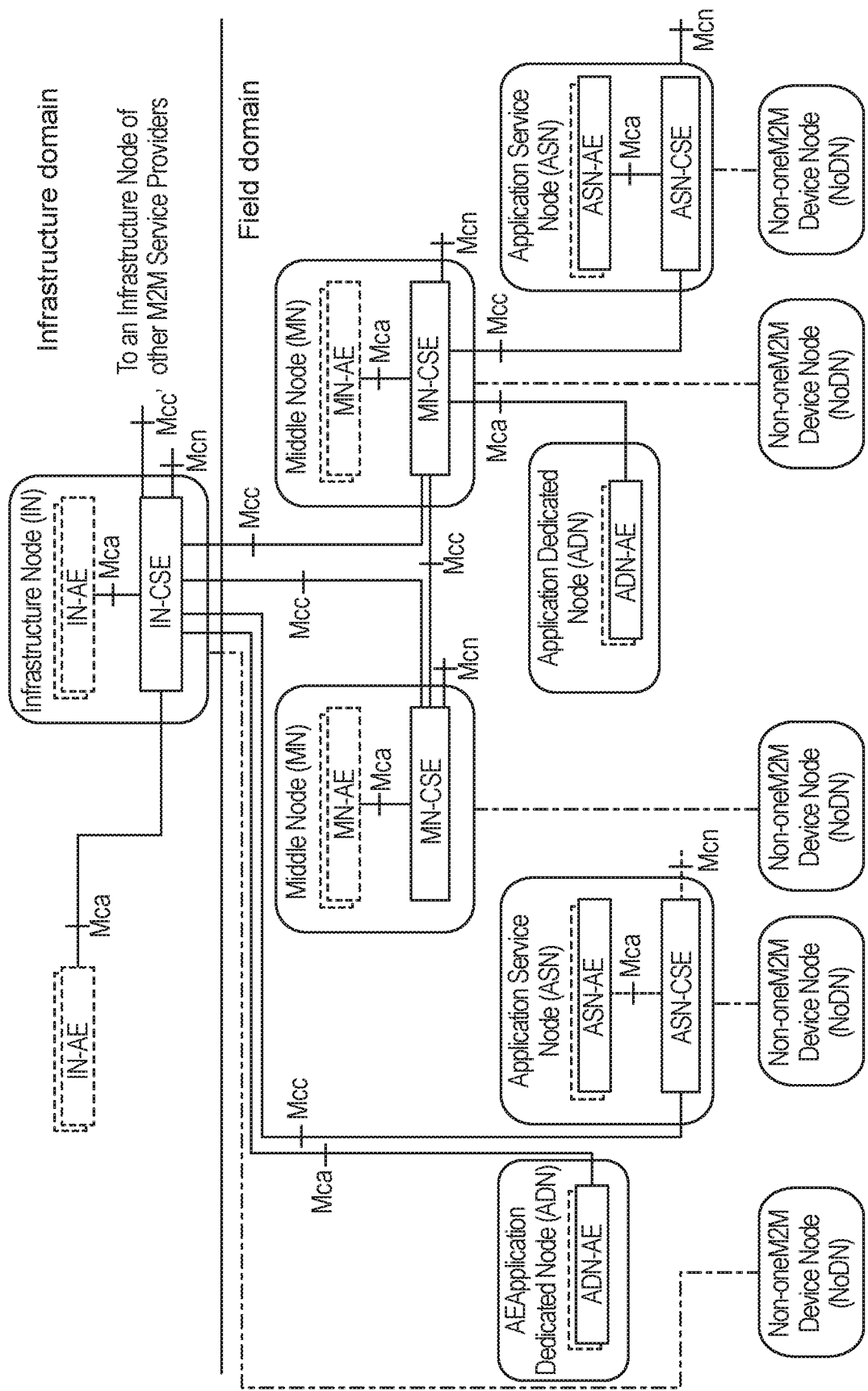
FIG. 3 is a block diagram of illustrating inter-connection configurations between the various entities supported within an example oneM2M system.

The inter-connection configurations between the various entities supported within the oneM2M system are illustrated in FIG. 3. This figure captures the hierarchical organization of the oneM2M system and provides a pictorial representation of the registration relationships which need to be established for communication purposes. Registration is defined as the process of delivering AE or CSE information to another CSE in order to establish a relationship allowing them to exchange information.

Note that for both AEs and CSEs, oneM2M supports registration to at most one other CSE. AEs register to the CSEs on the same node, or, in the case of ADN-AEs, MN-CSEs or IN-CSEs. The CSEs in "lower" nodes, e.g., ASN, MN, go through registration procedure to establish communications with the "higher" nodes, e.g., MN, IN.

Reachability and routing between M2M Nodes is associated with the CSEs and their connectivity is based on the Underlying Networks. Since AEs are registered to CSEs, communications with an AE is performed through its registrar CSE. A CSE Point of Access (CSE-PoA) aims to provide the information needed to reach a CSE from an Underlying Network perspective, i.e. information that could be resolved into a network address.

In oneM2M Systems, SL routing is handled by CSEs using Point of Access (PoA) information. This information is provided by one CSE to another, at registration time, as described in oneM2M-TS-0001, oneM2M Functional Architecture-V2.6.0. The criteria and procedures for updating a CSE-PoA by the registree, in addition to the regular CSE registration updates, are not standardized.

At registration time, a CSE creates the <remoteCSE> resource on the registrar, which contains the CSE-PoA information. The CSE-PoA is considered equivalent with the location of the <CSEBase> resource on the registree CSE.

The CSE-PoA for a registered CSE is specified to contain URI conforming to IETF RFC 3986 uses URI=scheme:/fullyqualifieddomainname/path/, or URI=scheme://ip-address/path/.

Addressing and routing related to a CSE may be achieved using this information when static, public IP addresses are assigned and use either direct DNS address translation or dynamic DNS address translation is used.

oneM2M specification TS-0001 assumes that the routing information related to a CSE (or target AE) in an M2M System depends on the characteristic of the Underlying Network and that the information to be conveyed as CSE-PoA needs to support Underlying Network specifics, however no UN specific information is included as part of the CSE-PoA.

oneM2M-TS-0001 section 9.3.2.2 assumes the availability of mechanisms through which Underlying Networks will specify the means for allowing an M2M SP to fetch the IP address associated with a CSE attaching to that Underlying Network. These mechanisms have to rely on the information to be included in the CSE-PoA for the registered CSE. However, no such mechanisms have been defined by oneM2M to date.

For this case the assumptions are that bindings between the registered CSE and the associated Underlying Network may be established through CSEs explicitly identifying the Underlying Network at registration/update time. Lacking explicit information, the M2M SP may derive UN identity, e.g., by using the link over which the registration arrived) and bind it to the PoA information.

oneM2M further specifies that UN specific information may be supported by oneM2M registration procedure for cases in which the IP address for the registered CSE cannot be used reliably and cannot be included in the CSE-PoA. For example, in scenarios where an M2M Node in cellular networks supports SMS and not reachable by a previously known IP address, the SMS device triggering mechanism may be used to wake up the M2M Node and renew the IP addresses or perform specific functionalities.

When an M2M Node attaches to a mobile network, the CSE-PoA for a registered CSE shall conform to the procedures associated with that mobile network. If an M2M Node is already attached to an Underlying Network and attaches to another Underlying Network, the CSE may update its PoA information at the remote CSE.

Figure 4:
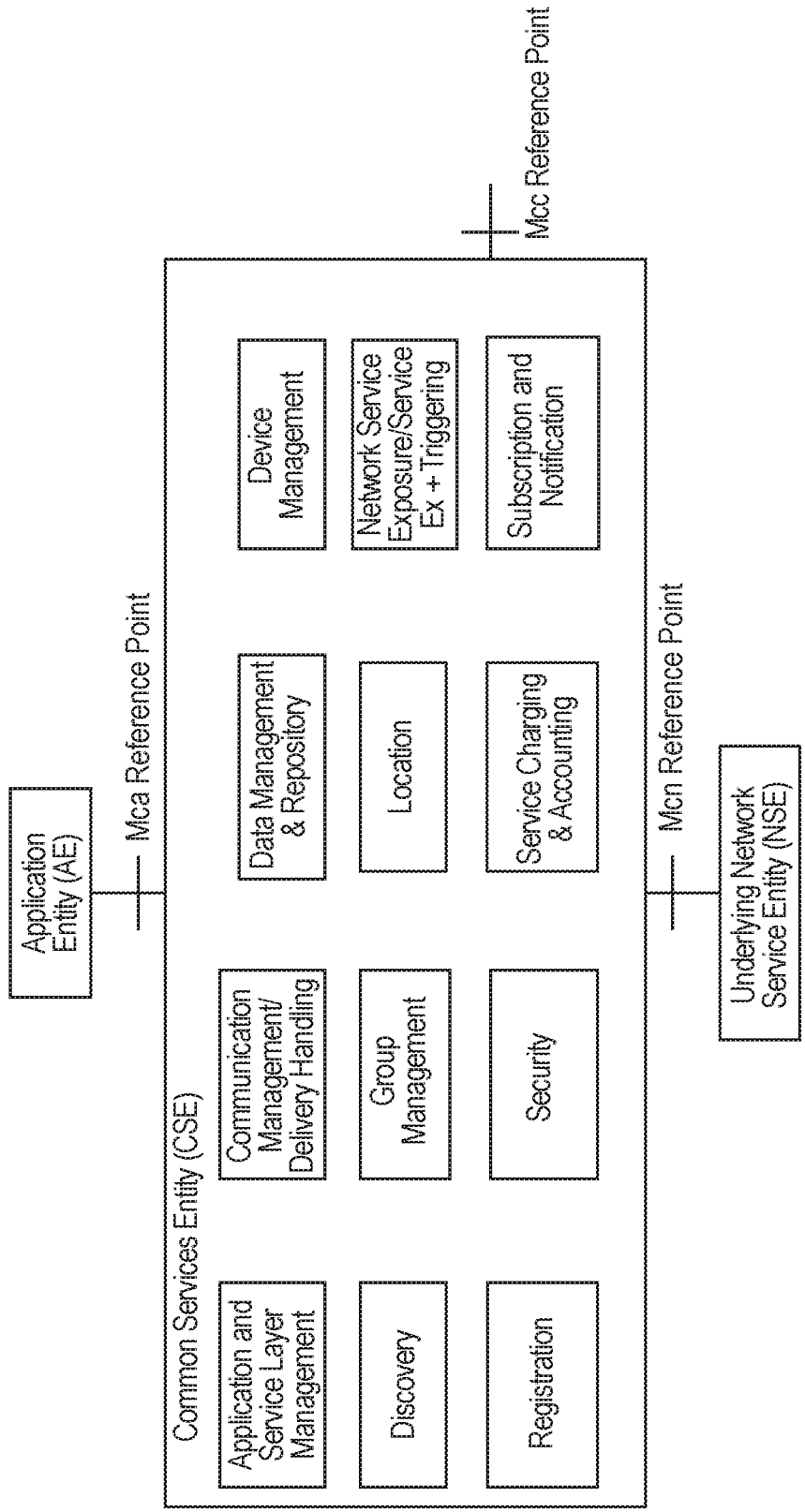
FIG. 4 illustrates example oneM2M Common Services Functions (CSFs), including CMDH.

FIG. 4 illustrates oneM2M CSFs, including CMDH. CMDH is a Service Layer message delivery function which operates at the message level. It is assumed that the requestor knows the destination. It delivers the messages based on provisioned policies. CMDH aids communication by processing request or response messages in transit, which are targeting entities other than the transit CSE itself, AEs registered with the transit CSE, or resources hosted on the transit CSE.

Figure 5:
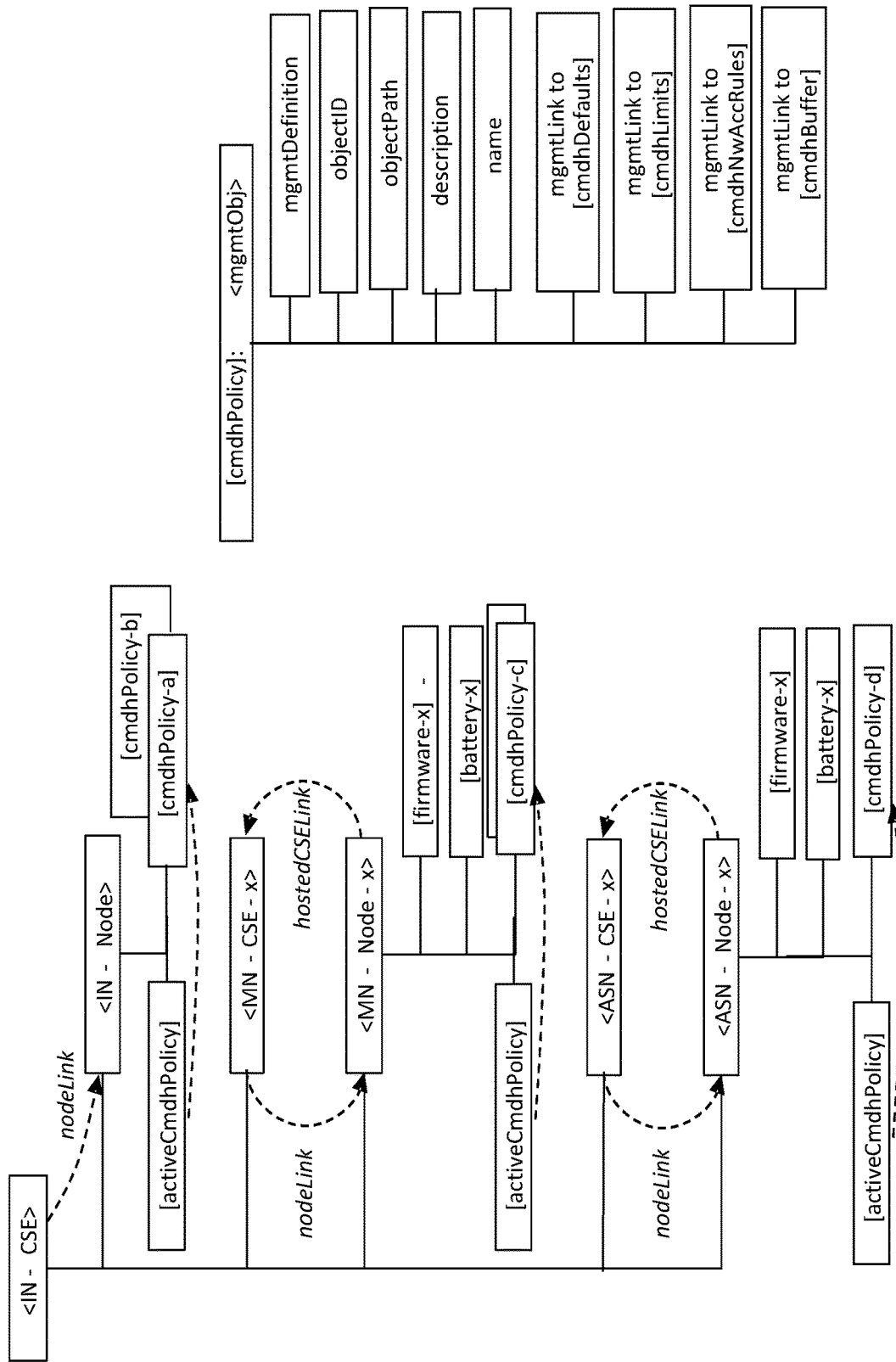
FIG. 5 illustrates an example [cmdhPolicy] resource and its relationship with other resources.
Figure 6:
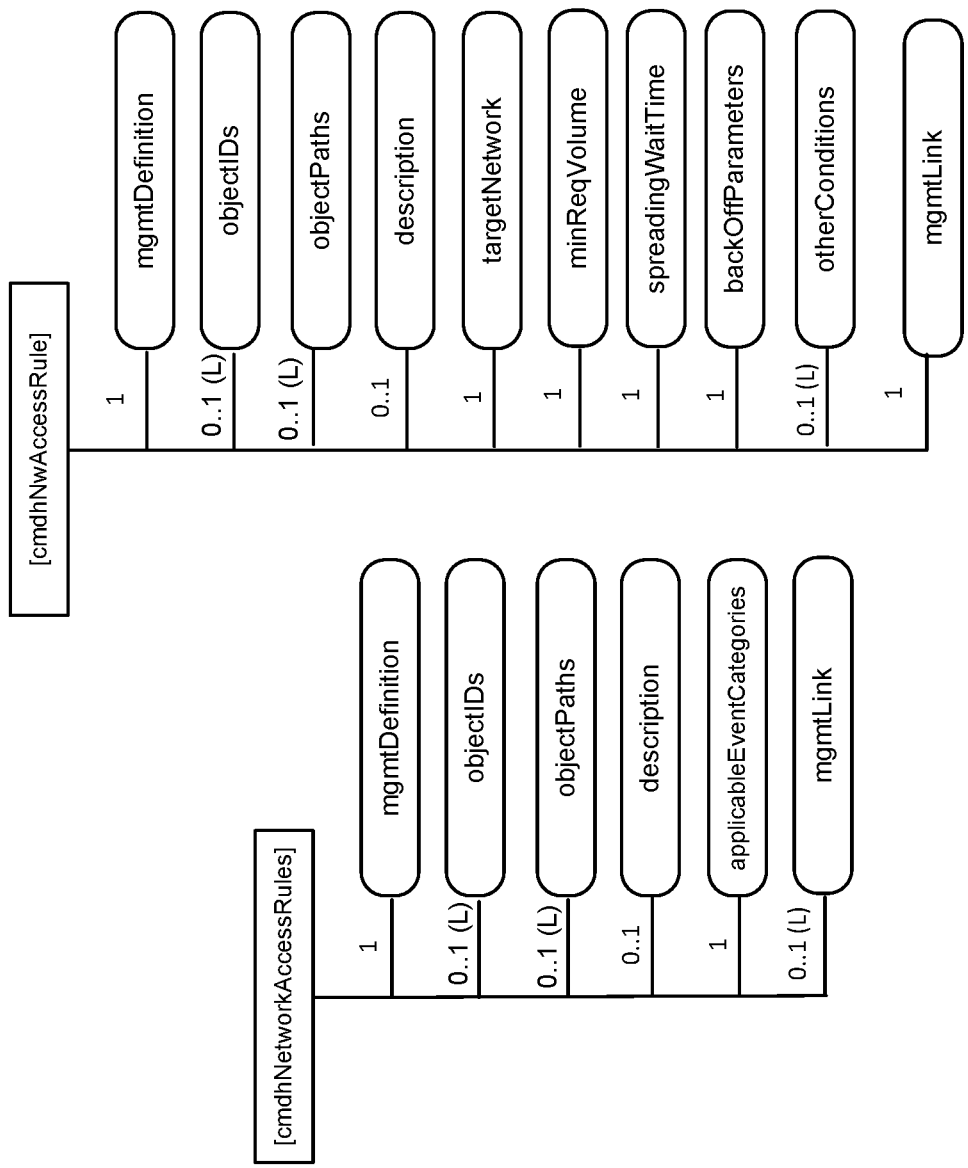
FIG. 6 illustrates example structures of CMDH policies.

FIG. 5 illustrates a [cmdhPolicy] resource and its relationship with other resources. When the CSE receiving message needs to forward the message to another CSE via CMDH processing, it uses provisioned policies (e.g., a [cmdhPolicy] resource) for validation and message forwarding processing. The basic description/structure of the CMDH policies is provided in FIG. 6, which includes CMDH policies pertaining to UN access rules.

The active policies used in processing pertain to all the CMDH processing in the transit node and are provided via Device Management procedures. As such, the content of the policies is not dependent on preferences provided by either the Originator or Target. The CMDH processing which operates at message level references UN access rules in the policy based on the "event category" ('ec') request parameter set by Originator). The ec' parameter has the choices of "immediate", "best effort" and "latest", and therefore do not provide enough granularity or context for UN association. Moreover, it cannot be assumed that Originators (e.g., applications), have access to CMDH policies; therefore, the choice of ec' category cannot be based on the characteristics of the UNs represented in the policies.

The applicableEventCategories attribute of the conventional [cmdhNetworkaccessRules] management object defines the requests for which the rules contained in the linked [cmdhNwAccessRule] resource is applied. Therefore, the network usage rules defined inside [cmdhNwAccessRule] child resources are applicable for all the requests associated with that specific 'ec' value, and cannot be differentiated by application. Moreover, it is not clear how the applications would have an understanding of the meaning of the ec' choice, since they might not have access to Device Management policies.

Figure 7:
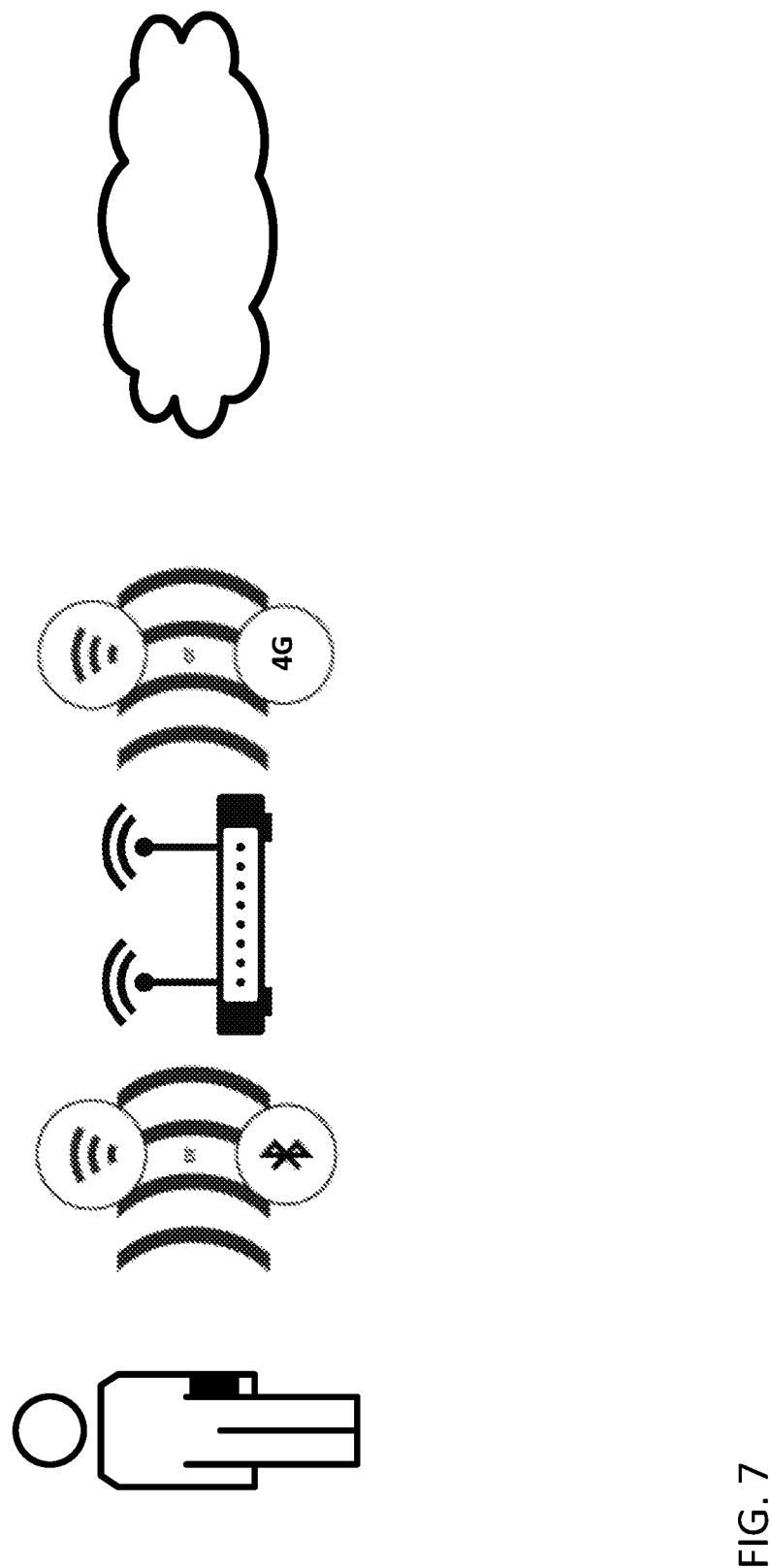
FIG. 7 illustrates an example system based on a platform providing common services, such as a oneM2M service layer.

FIG. 7 illustrates an example eHealth system based on a Service Layer platform providing common services, such as a oneM2M Service Layer. The system includes a mobile medical gateway which has a variety of sensors and devices connected to it. The gateway is a multi-interface device which may be connected simultaneously via its various interfaces.

The gateway may communicate with stand-alone devices, not shown, such as environmental sensors, cameras providing patient setting context, etc. Other sensors may be embedded in more complex devices, such as wearable devices for patients or medical staff that provide multiple functions.

In this case a patient wearable device hosts an application "Vit" which processes patient vital data (e.g., EKG and insulin pump data. This application communicates with the service "VitS(ervice)" on a private medical network, accessible on the infrastructure at vit.private.medical.com. The user would like to provide a setting such that the data transfers normally use Wi-Fi for the device—to-gateway communication, and cellular 4G for the gateway-to-infrastructure communication, for added security. However, when certain content is accessed, such as "how-to" videos from the doctor, they may be accessed via the lower-cost Wi-Fi connection with the infrastructure.

Figure 8:
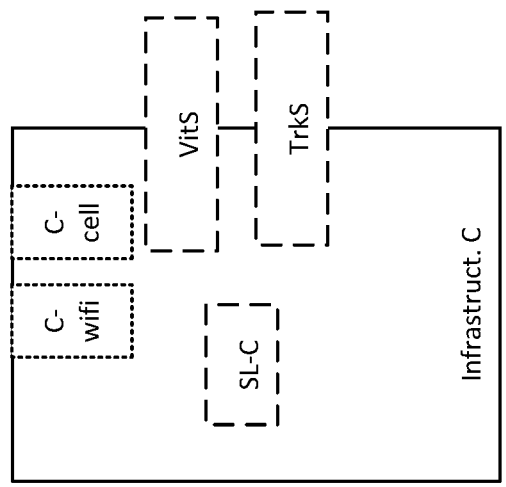
FIG. 8 illustrates an example of three devices, with various interfaces and applications available at each node.
Figure 8:
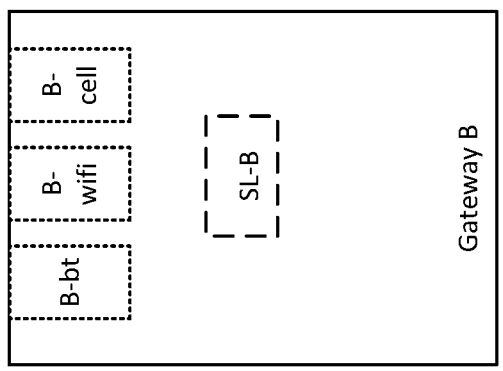
Figure 8:
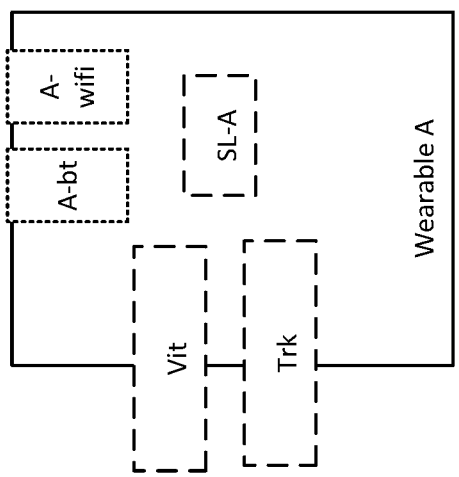

FIG. 8 illustrates three devices, a Wearable A, a Gateway B, and an Infrastructure C, with various interfaces and applications available at each node. For example the Gateway B uses a B-bt interface for Bluetooth, its B-wifi interface for Wi-Fi, and B-cell for cellular connections. The Wearable A is also a multi-interface device supporting Wi-Fi connections and Bluetooth, while the infrastructure C supports cellular and Wi-Fi connectivity. An application "Trk" on the Wearable A device provides activity monitoring which relies only on step counting. The user, which uses this functionality mainly for historical purposes, prefers accessing and uploading the data occasionally via the service application "TrkS(ervice)" at track.public.com, not shown, using the Bluetooth connectivity to the gateway and Wi-Fi between the gateway and the infrastructure. The three entities in FIG. 8 are Service Layer enabled, with SL-A, SL-B, and SL-C denoting the service capabilities on each node. The Underlying Network usage settings may be provided by the respective applications, rather than by the node/operating environment, although specific/limited policy choices may be provided. The behavior of the nodes based on these setting may be consistent across the different devices In enabling applications to set such communication preferences as in FIG. 8, several issues may be encountered. As a first example, The Vit application on the wearable may send a communication with VitS first to the gateway, since it is registered to it. It uses the gateway Point of Access (B-PoA) information obtained at registration, which has a list of three FQDNs, corresponding to B-bt, B-wifi, and B-cell. Without the use of Device Management, the Service Layer of the wearable is unable to use the preferred interface to the gateway. Moreover, Vit is currently unable to set a preference for the gateway to infrastructure node communication.

As a second example, the uplink gateway communications may use the infrastructure Point of Access (C-PoA) which might have several addresses, all independent of the destination application. Communications with VitS may need access to a specific DNS server (Spriv) of the private domain in which this FQDN resolves. Even if the Spriv address is available, if the DNS lookup request is sent via an incorrect interface, the private DNS server is not reached and the DNS lookup fails or, in case of address overlap, may result in an incorrect destination. These cases are not solved, e.g., by the RDNSS technique. In oneM2M, sending the DNS lookup request to the wrong interface may occur in a variety of cases, such as when, for example, the gateway implements CMDH and both applications use communications with the event category 'ee'=immediate. When the gateway is already communicating with the infrastructure using Wi-Fi (e.g., for Trk data), messages from Vit coming at this time will be processed using the same CMDH policy as those for Trk, and the Wi-Fi interface would be used. If the gateway does not implement CMDH functionality, there is no way to indicate the UN preference.

As a third example, assuming that a oneM2M gateway implements CMDH functionality to provide UN differentiation to the Service Layer, standard methods are based on node-scoped administrative policies provided via Device Management. The application may provide dynamically an event category, but without access to the policies there is no understanding of how exactly the category will be processed. This functionality is equivalent only to the "Basic" use of PvD support as outlined by IETF, while clearly more advanced uses involving application preferences and options have been identified. Furthermore, the wearable Service Layer cannot leverage the existing policies/mechanisms at the gateway for its communication to the infrastructure.

One problem related to use of underlying networks when multiple interfaces are available is that standard Service Layer solutions have no explicit bindings between underlying network, network interfaces and Service Layer entities, without which Service Layer cannot provide effective connection management. SL implementations relying upon existing connection management mechanisms in the underlying OSs cannot rely upon consistent behavior across different platforms.

A second problem is that standard Service Layer mechanisms for providing preferences for underlying network connectivity use do not allow for differentiation by application, or for the provision of preferences at nodes along the path of a request. This constrains the Service Layer from providing more complex communication management services in an environment of multi-interface nodes, although the nodes might possess the interface capabilities.

A third problem is that standard Service Layer mechanisms do not offer methods for setting preferences or underlying network connectivity use when accessing individual resources. This prevents the Service Layer from providing services for resource-level connection management, which instead need to be performed by applications.

Enhanced communication management may be supported at the Service Layer, using lower layer information about interfaces and underlying networks available, together with SL-specific information about applications and their communication preferences. This is useful in the context of systems that have multiple logical interfaces in each node, but may be implemented in single-interface nodes as well. In this context, the term "Interface Management" will be used interchangeably with "Communication Management".

Such systems normally include discovery and registration mechanisms through which different SL entities first discover each other. Discovery is generally followed by a registration process which allows the nodes to exchange information, such that further communication and services may be provided.

In general, the communication management services are offered by a registrar SL entity (e.g., an MN-CSE) to a registree SL entity (e.g., an ASN-CSE), and vice versa. This may also include services provided to registered applications (e.g., MN-AE or ADN-AE) and to entities without a registration relationship.

In a Service Layer, the M2M System communicates using SL specific identification of entities for addressing purposes and IP addresses for Service Layer routing information. Additional information may be managed in the SL, which may be used for binding underlying network information, via interfaces, to the SL addressing. This enables the ability to provide preferences/options for the purpose of performing communication management in the Service Layer.

Figure 9:
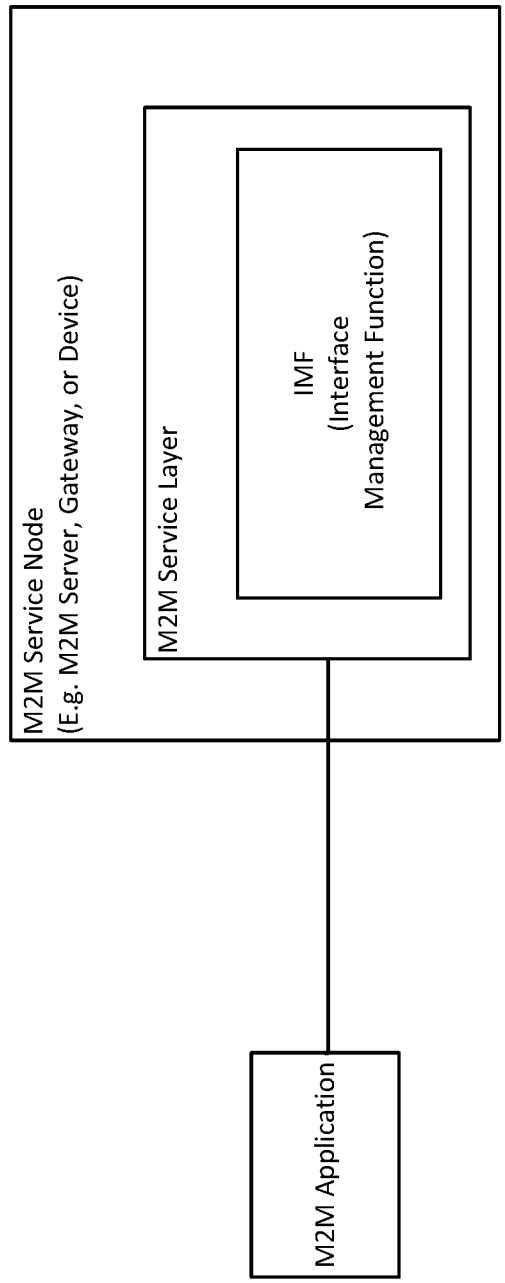
FIG. 9 illustrates an example Interface Management Function (IMF).

As illustrated in FIG. 9, an Interface Management Function (IMF) that may support, but is not limited to, the following types of functionality: administering information pertaining to each configured interface and exposing it to entities in the Service or Application layers; administering Service Layer point of contact information for the SL entities with which the SL communicates with; creating and managing UN interface mappings for SL message processing purposes; and processing SL messages for forwarding to the next SL hop based on the interface mapping maintained.

Service Layer communications between entities require knowledge of SL specific identification, as well as IP addressing for routing at the lower layers. To facilitate communication and interface management, new configuration information may be used in the Service Layer, including Configuration Objects and message parameters for dynamic interface requests. In order to utilize this information in SL message processing, interface mapping tables may be first created. SL message processing may then be based on the mapping tables.

Table 3 illustrates parameters that may be included in configuration objects/resources to facilitate enhanced communication and interface management services. Such parameters may be defined for the logical interfaces available at the node. There may be one interface object for each logical interface available in a node. For a MIF node, a list of applicable Interface Objects may be accessible to the SL functionality on the node, including to the IMF. In Table 3 these parameters include an example "Explicit Configuration" of the interface.

TABLE 3

| | | Interface Object |
|---|---|---|
| Parameter type | Parameter | Description |
| Binding Information | Interface ID | ID of the interface within the set maintained for a specific node |
| | Interface Scope | Contains a list of the addressed entities which are associated with this interface, e.g., applications on the node which indicate preference for this interface. Entries may include "this_SL" for the local SL entity and "forwarding" for messages targeting other entities. See Embodiment section for oneM2M usage examples. If unspecified any transit messages and those targeting local entities may use this interface. |
| | Interface Type | Indicator of logical interface type, e.g., Cellular, Bluetooth etc. a choice from a specified set of values. The list may include qualifiers such as "lowest cost", "highest security", "lowest power", etc. |
| | Interface Context | Context for the interface selection for, may include e.g., to/from address, available time etc. each of which needs to be matched for the interface to be used. Depending on implementation, a single entry may be defined as a list of several parameters which may be used together for context match evaluation e.g., min/max battery level, battery cost measure, etc. The context contains also information about the optionality of each context condition. (optional) |
| Explicit configuration | Target Network | The target network parameter defines which Underlying Network is used though the logical interface. This may be a list for logical interfaces abstracting multiple target UN. If unspecified, IMF may not be capable of making decisions based on UN characteristics, but may still provide binding. (optional) |

TABLE 3-continued

Interface Object

| Parameter type | Parameter | Description |
|---|---|---|
| | UN access info link | Link to other objects/resources with information to be used for accessing the UN, such as: bandwidth, latency, packet loss, security parameters, etc. This may be a list, if multiple target networks are specified in the preceding parameter, in which case the list order should correspond (optional) |
| | Domain Name | Name of the domain(s) used for resolving the address information, may be a list (optional) |
| | DNS Server | The DNS Server(s) used for resolving the address information, if not expressed as IP address. May be a list. (optional) |
| | Domain Access Indicator | Indicates if the domain requires access though the indicated DNS server(s) exclusively (e.g., within private domains). This parameter may be used for deciding if bindings should be mandatory or not, or if the DNS server entry may be updated/changed. If not specified, a default convention must be adopted, e.g., by default the DNS Servers specified in other entries of the interface list may be tried to resolve address resolution issues. |
| | OSId | Operating system identifier. The format may be an Universally Unique IDentifier (UUID) as specified in IETF RFC 4122 (optional) |
| Reference Information | PvD | Link to a provided PvD which may be communicated via lower layer API. See, e.g., Multiple Provisioning Domain Architecture - RFC7556 https://tools.ietf.org/html/rfc7556. (optional) |
| | Other Policy Links | Link to a provisioned policy e.g., CMDH (optional) |
| | Multiple Configuration Rules | Rules for the use of multiple configurations such as explicit, PvD, CMDH policy, etc. This may be implemented as a set of several parameters indicating further rules about how a merge may be accomplished. At its simplest it provides rules about which configuration to be used in case of multiple setting: PvD, CMDH or explicit parameters. (optional) |

Interface Objects may contain one entry per interface, and each entry may contain a number of types of parameters. Binding information may be used in conjunction with PoC object parameters for achieving the interface bindings. Explicit configuration may containing parameters describing the Underlying Network and domain, and used for UN identification and selection. The purpose of the Explicit Configuration is to provide the interface characteristics to the Service Layer.

The explicit configuration may be provided/updated by existing SL methods, e.g., CRUD operations. Alternatively, the explicit configuration may be built by the IMF function from non SL-specific information. The latter may be acquired several ways. First, it may be pre-provisioned as non-SL-specific configuration, e.g., Network Interface Card configuration Second, it may be provided/updated as policy via existing methods e.g., Device Management, ADNSF. Last, it may be distributed dynamically as PvD.

Non-SL-specific information may be linked to the Interface Object, in which case the links belong to the "Reference Information" section of the Interface Object, along with the Multiple Use Rule. In the "simplest" SL case, only the Explicit Configuration and the Binding Information elements of the object are maintained.

PvDs and other policies, (such as CMDH in oneM2M, allow IMF to use non-SL information provided via existing mechanisms for populating/updating the Interface configuration based on the Multiple Configuration Rules. For example, for PvD-aware nodes, the Interface Object may be created simply by parsing the provided PvD and using its content to populate the Explicit Configuration Preserving the link to the PvD file allows for future access as needed. Similarly, in oneM2M IMF may use information from provisioned CMDH policies.

The "Multiple Configuration Rules" parameter may indicate the use of an existing configuration method, e.g., a PvD file/object, to overwrite and initial explicit configuration. These rules may be implemented as well as a set of several parameters indicating how multiple configurations may be used together or merged.

Since entries in the Interface Object list are logical entities, several entries may be created for the same interface to enable the use of alternative interface configurations. For example, a DNS Server provisioned by one interface may be used for name resolution on a different interface, if address resolution fails due to an inaccessible DNS server. If the "Domain Access Indicator" allows it, the IMF may choose to create a new entry with the UN information of the original interface and the DNS server from another. If the new configuration is successful in resolving the issue, it may be made available to applications which would otherwise use the original interface.

Figure 10:
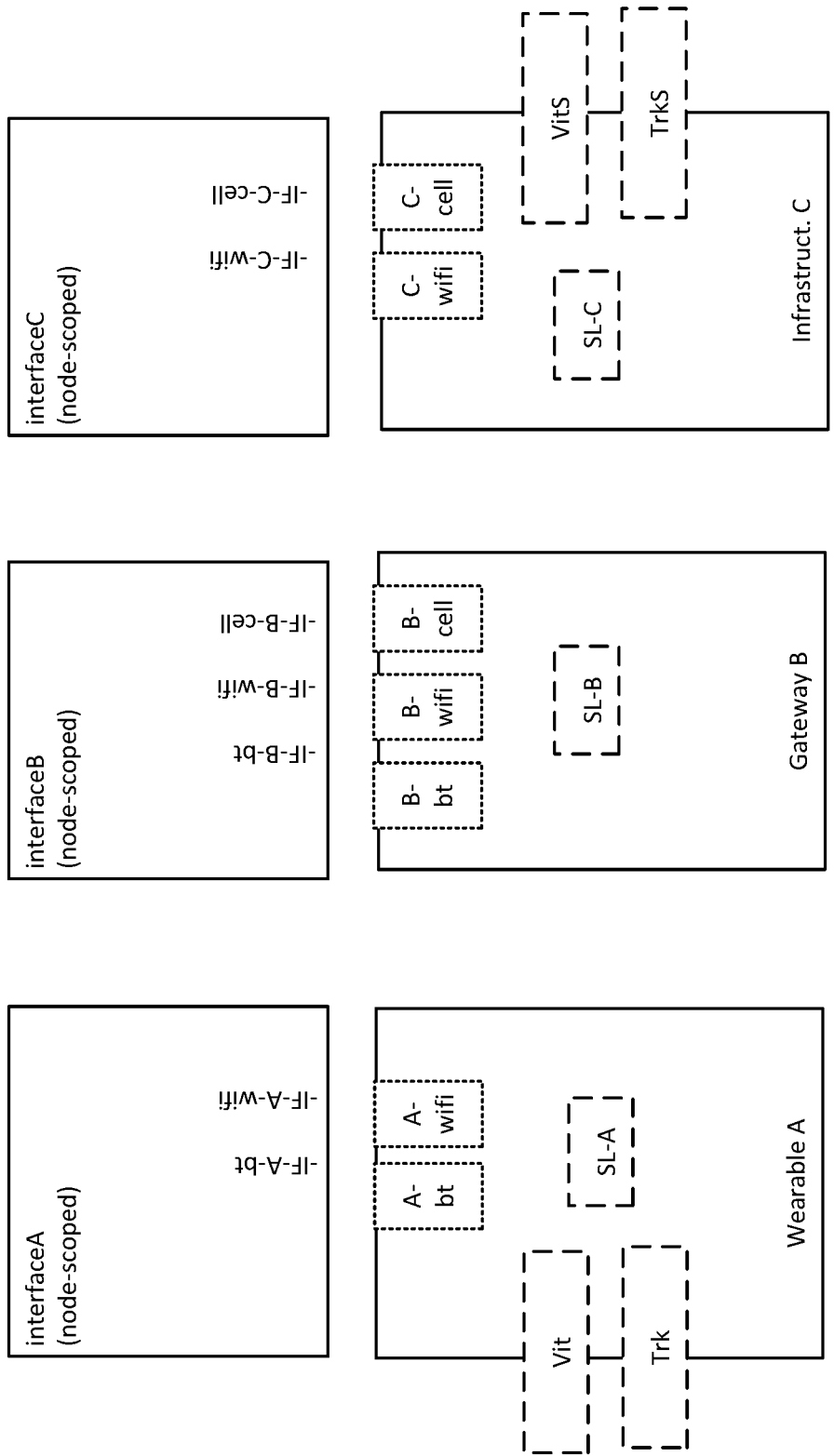
FIG. 10 shows example interface objects for each of the nodes in the example of FIG. 8.

FIG. 10 shows Interface Objects on each of the nodes in example of FIG. 8. Here in FIG. 10, Interface Objects are node-scoped. However the individual entries in the list describe each an interface available. For simplicity, in the following sections, the Explicit Configuration portion of the entries is considered pre-provisioned.

Service Layer connections rely on addressing at the IP stack level, as well as SL identities. Point of Contact information provided by SL entities (e.g., CSEs) as well as applications (e.g., AEs) may include, in addition to IP level addressing, interface use preferences, context, and priorities. In addition to the SL entities and applications, Point of Contact information may be provided at resource level as well, for accessing individual resources. Point-of-Contact objects/resources may contain information such as the parameters defined below in Table 4, for example.

TABLE 4

Point of Contact Object

| Parameter | Description |
| --- | --- |
| Entity ID | SL level ID of the entity to which the Point of Contact belongs (same for all the PoC in the list) |
| Point of Contact ID | ID of the Point-of-Contact configuration/object, for ease of reference (optional) |
| Address | Address (e.g., FQDN, IP) for communicating with the entity or resource, which is resolvable to an IP-level address. A list of addresses may be provided, in which case they may be used in the order provided, should any fail to resolve. |
| Associated Interface | Link to an Interface Object (or the interface ID) of the host, indicating the interface preference. If only one entry is provided, the association is mandatory. If multiple entries are provided the order of appearance in the list is the preference order. If no entries are given any interface may be used, according to other policies. |
| PoC Priority | Priority of the PoC Interface among the set. Lowest number has highest priority. If not provided the default is a high number/low priority, and the default for all entries should be the same. (optional) |
| PoC Context | Context for the use of the PoC, it may be implemented as a list of parameters for a variety of context types. For example, it might provide schedule information, traffic patterns, stationary indication, etc. The context contains also information about the optionality of each context condition. (optional) |

In addition to its use for application and SL entity access, the Point of Contact object may be used to provide access information for content-sharing resources, e.g., <container> or <flexContainer> in oneM2M. Information such as traffic patterns, schedules, etc., may be used in conjunction with the Point-of-Contact and associated interfaces for connection management purposes.

In Table 4, the address and optional ID may be preconfigured with the application. However, the address may be updated, similar to the PoA information in oneM2M. For example, if a FQDN is configured initially but an IP address is later resolved, the address may be updated based on current information, using existing SL methods. The Associated Interface, PoC Priority, and PoC Context are new parameters to be used for binding with the interface.

Figure 11:
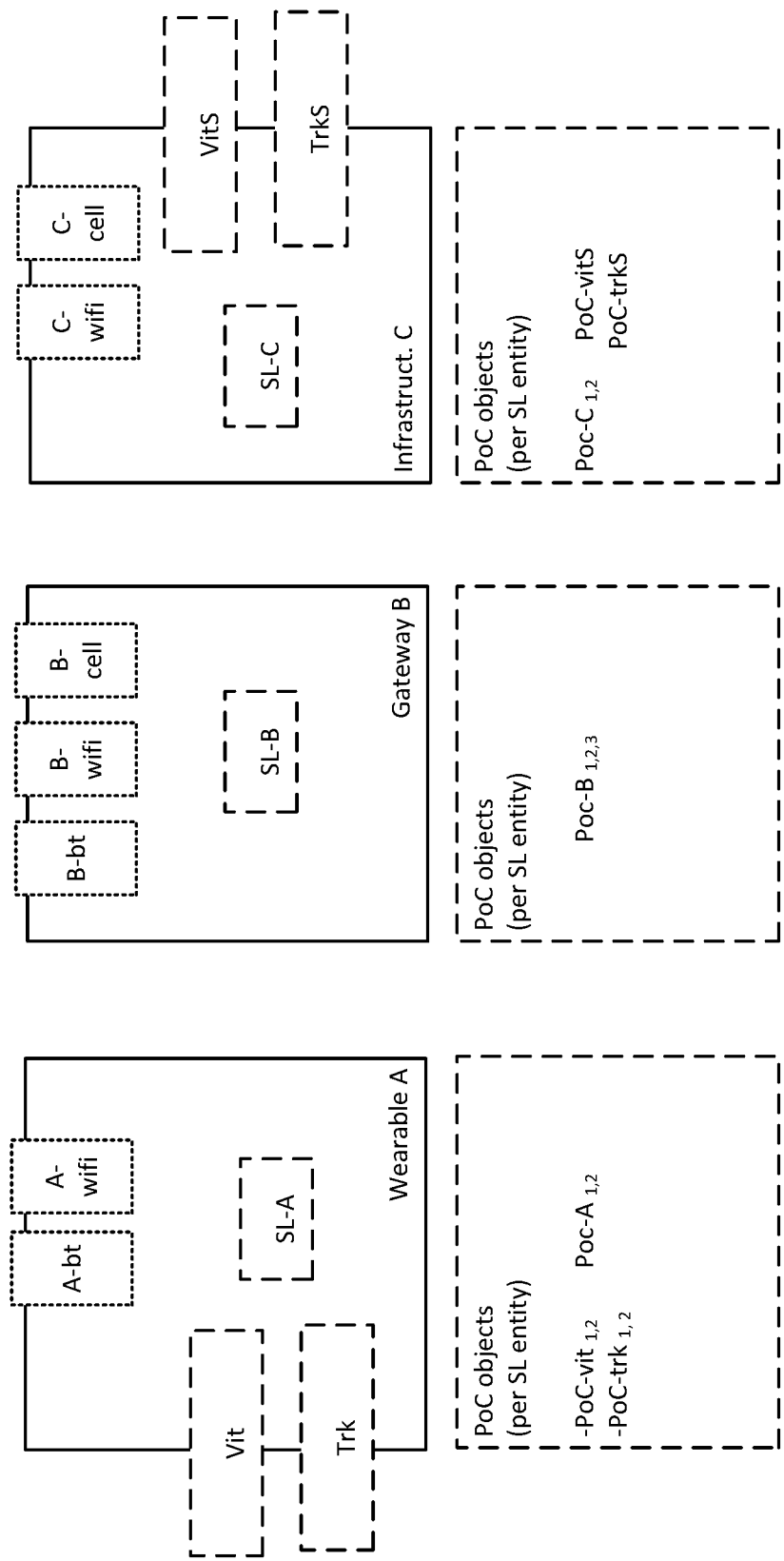
FIG. 11 shows example Point-of-Contact (PoC) objects for each of the nodes in the examples of FIG. 10.

FIG. 11 shows Point-of-Contact (PoC) Objects on each of the nodes in the examples of FIG. 10. There is one PoC list for each described entity, e.g., for each application or SL entity. However, each PoC list might have several entries. The purpose of each PoC entry is to provide different addresses and the associated preferences for accessing the entity. The PoC objects are created by the respective entities, which might rely on different mechanisms such as user interfaces or pre-provisioned rules to create them.

In addition to using configurations enabled by the Interface Objects and the Point of Contact Configuration Objects, an entity may also specify preference for a given UN interface using a dynamic interface request. To enable a method for dynamic interface requests, request messages may be enhanced with an "interfaceType" parameter. The interfaceType parameter may be used by the request originator to indicate that an interface of specified type should be used for the message. If the parameter is empty, the interface use is determined using the other information available in the local Configuration Objects or policies. This parameter maps to the "Interface Type" in the Interface Configuration Object. The message should indicate if requests for a specific interface type are mandatory or optional, therefore a separate interfaceTypeOptionality may be defined.

Alternatively, the interfaceType values may be derived from the "Interface Type" value choices, and include optionality information. For example for (Configuration Object) "Interface Type"={WLAN, Cellular . . . }, request parameter interfaceType={WLAN-mandatory, WLAN-preferred, Cellular-mandatory, Cellular-preferred . . . }.

Figure 12:
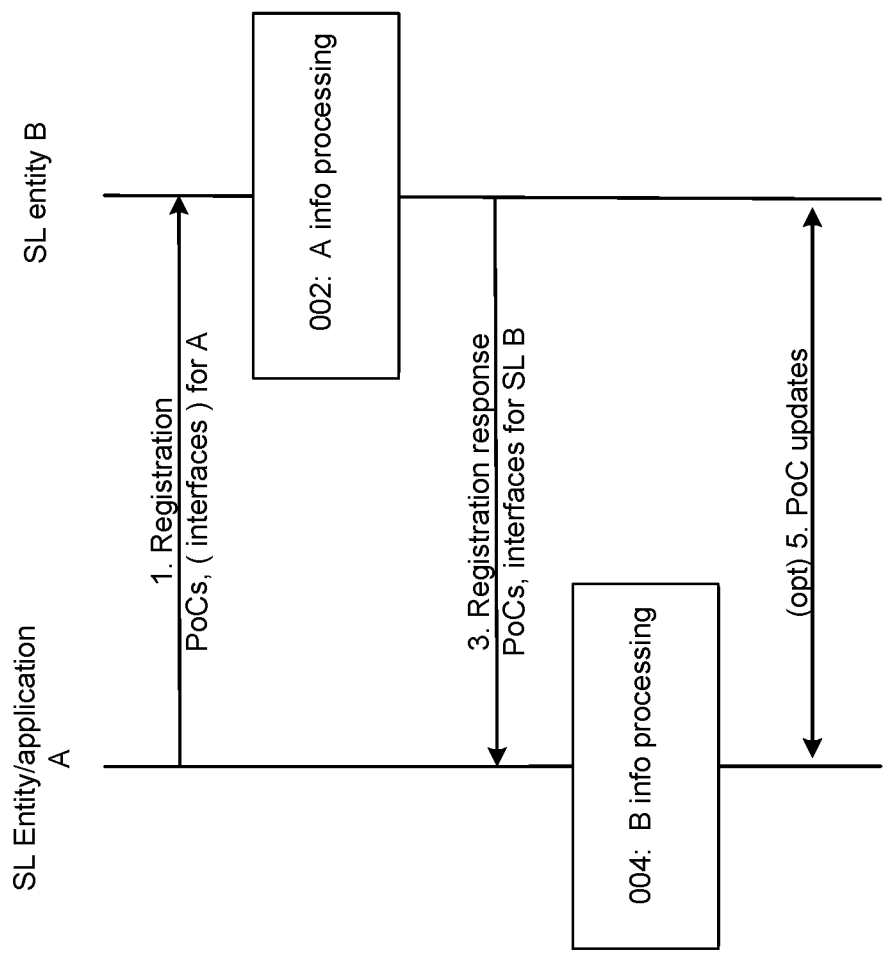
FIG. 12 shows an example call flow of a generic registration procedure which results in each entity providing the other with information to enable further communications.

Since in the Service Layer communication services are generally offered by a registrar SL entity (e.g., an MN-CSE) to a registree SL entity (e.g., an ASN-CSE) or vice versa. FIG. 12 shows an example generic registration procedure which results in each entity providing the other with information to enable further communications. For entities providing SL services (e.g., CSEs), both Interface and PoC information is made available via registration. For application entities (e.g., AEs) which rely on the SL entities for communication services, only PoC information is provided at registration, including interface preferences if available. The mutual registration may result in updates to the Point of Contact information.

FIG. 12 depicts an abstract, high level information flow only. Communication steps such as 1 and 3 may be realized via the exchange of multiple messages and associated acknowledgements, or information exchange may occur via data retrievals rather than data forwarding.

For simplicity, in the following sections SL entities which have performed a mutual registration will be described as "neighbors." Current procedures require SL messaging to be sent first to neighbors when addressing other entities with which there is no registration relationship. Applications registered to SL entities are not neighbors, they are simply "registrees."

Given that standard Service Layers assume the existence of only one node and one SL entity in each device, in the following descriptions it may be assumed that a node's Interface Object "belongs to" (is managed by) the SL entity (via IMF) on the node, along with the entity's PoC. For applications, it may be assumed that each owns/manages its own PoC, which it exposes to its registrar. Changes to the objects are propagated to the nodes to which they have been exposed.

The Interface and PoC Objects are used by the IMF function for interface mapping and SL message processing. As an intermediary step, the IMF builds and maintains neighbor and interface status information. This includes a Neighbor Access Table, whereby for each neighbor N, a table with its IP-level addresses resolved via each interface is maintained, using the following parameters: Interface ID; Address; Interface type; and Network Interface ID. The Interface ID is an ID of the interface used for communication with the neighbor N. Over time, each neighbor may have been accessed via several interfaces. The Address is an IP-level address resolved for neighbor N via the interface with the ID. The Interface type: this value is obtained from the corresponding Interface Object, or may be derived from available policies linked though that Interface Object. The Neighbor Interface ID is obtained from the neighbor's Interface Object.

The IMF may also build an Interface Status List where, for each interface on this node, the activity status is maintained, with next hop information for each active interface. The Interface Status List may include: an Interface ID; Status; Next Hop; Address; Originator Scope; and Destination Scope. The Interface ID is an ID of the interface. The Status may be active or inactive, depending on the receive/transmit state. The status is provided by the lower layers and its determination may be implementation dependent. The Next hop is the SL entity reachable via this interface. It is valid and meaningful only for active interfaces. The Address for active interfaces is the IP-level address used for the active communication. The Originator Scope is a list of addresses that are associated with this interface, e.g., applications which indicate preference for this interface. The Destination Scope is a list of destinations associated with this interface, e.g., applications on the neighbor node which indicate preference for this interface. This information is extracted from the "Interface Scope" parameter of the neighbor's Interface Object.

Figure 13:
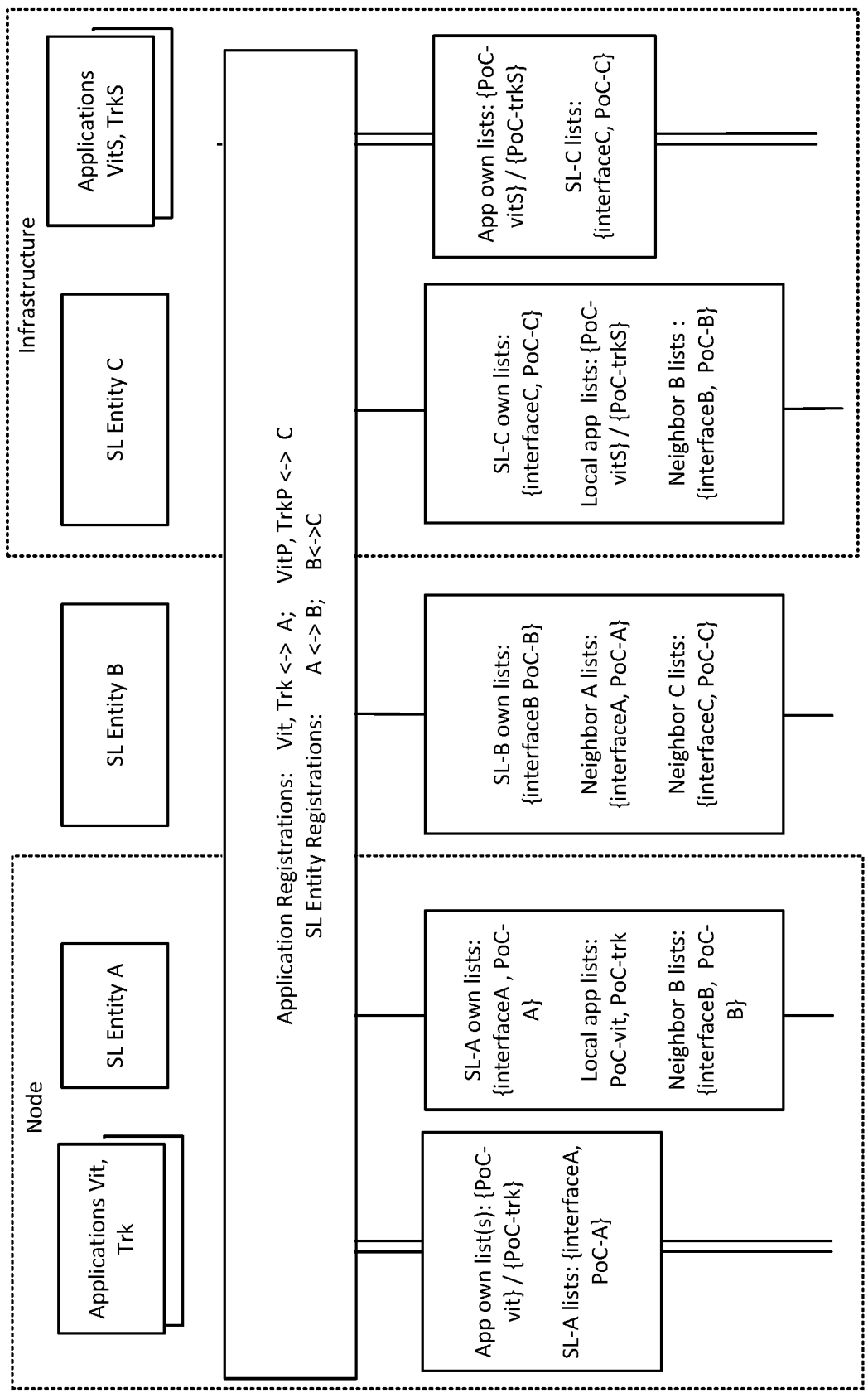
FIG. 13 shows example neighbor access tables and interface status tables at each of the SL Entities in the example of FIG. 11.

FIG. 13 shows IMF builds the Neighbor Access Tables and the Interface Status tables at each of the SL Entities for the example of FIG. 11. First, each entity and application has its "own" information (RW). SL Entity A and SL Entity have local applications lists. Registree app information is also shown, which may generally be modified by both application and SL entity (RW). The applications list other information such registrar, and SL Entities A, B, and C, show neighbor lists.

A first example is registrations using Cellular (B-C) and Bluetooth (A-B) interfaces. Vit and Trk register at A. SL-A updates its interfaceA configuration object by adding AE-Vit and AE-Trk to the scope of each of the preferred interfaces. This is done based on the "Associated Interface" and "Priority" parameters of the applications' PoC. As noted before, whenever an Interface configuration is changed, it is assumed to be updated at the entities to which it has been exposed as well.

Mandatory interface mappings may include Vit to Wi-Fi (IF-A-wifi) and Trk to Bluetooth (IF-A-bt). After successful registrations, the interfaces and IP-level addresses used during the registration may be captured Bluetooth A<->B registration and cellular B<->C registration. Each SL entity may put all the registration partners/neighbors into a list and creates a Neighbor Access table for each of the neighbors. In addition, at each SL entity an Interface Status Table is created.

The IP-Level address information provided by each entity has been resolved using the respective interfaces. For example, the point of access provided in POC-B and associated with the Wi-Fi interface has been resolved to a valid

TABLE 5A

SL-A Neighbor Access List

| Neighbor | Interface ID | Address | Interface type | Neighbor Interface ID |
|---|---|---|---|---|
| SL-B | IF-A-bt | PoC-B1 | Bluetooth | IF-B-bt |

TABLE 5B

SL-A Interface Status Table

| Interface ID | Status | Next hop | Address | Originator scope | Destination Scope |
|---|---|---|---|---|---|
| IF-A-bt | Active | SL-B-ID | PoC-B1 | SL-A, Trk | SL-B, Forwarding |
| IF-A-wifi | Inactive | | | | |

TABLE 6A

SL-B Neighbor Access List

| Neighbor | Interface ID | Address | Interface type | Neighbor Interface ID |
|---|---|---|---|---|
| SL-A-ID | IF-B-bt | PoC-A1 | Bluetooth | IF-A-bt |
| Neighbor | Interface ID(local) | Address | Interface type | Neighbor Interface ID |
| SL-C-ID | IF-B-cell | PoC-C1 | Cell | IF-C-cell |

TABLE 6B

SL-B Interface Status Table

| Interface ID | Status | Next hop | Address | Destination Scope |
|---|---|---|---|---|
| IF-B-bt | Active | SL-A-ID | PoC-A1 | SL-A, Trk |
| IF-B-cell | Active | SL-C-ID | PoC-C1 | SL-C, Forwarding |
| IF-B-wifi | Inactive | | | |

TABLE 7A

SL-C Neighbor Access List

| Neighbor | Interface ID | Address | Interface type | Neighbor Interface ID |
|---|---|---|---|---|
| SL-B-ID | IF-C-cell | PoC-B1 | Cell | IF-B-cell |

TABLE 7B

SL-C Interface Status Table

| Interface ID | Status | Next hop | Address | Destination Scope |
|---|---|---|---|---|
| IF-C-cell | Active | SL-B-ID | PoC-B1 | Forwarding, SL_B |
| IF-C-wifi | Inactive | | | | address when being accessed by SL-C, using the domain name and DNS server in the IF-C-wifi entry.

Figure 17:
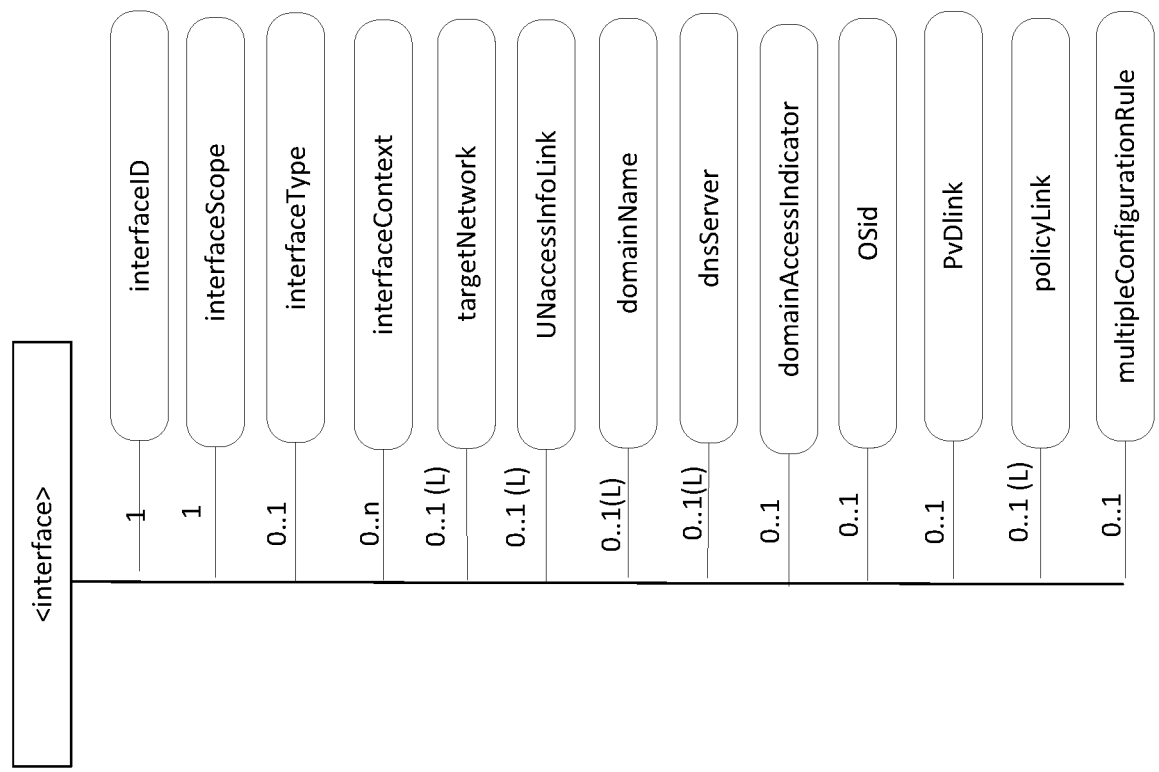
FIG. 17 shows an example oneM2M interface resource with a set of a set of attributes.
Figure 18:
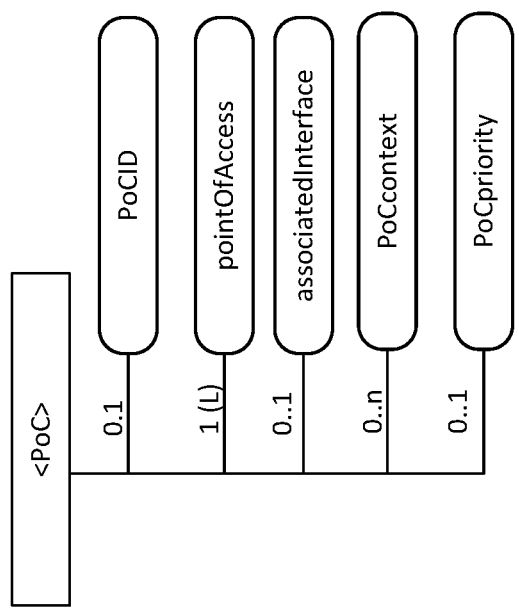
FIG. 18 shows an example Point of Contact <PoC> resource

A second example is activating a new A-B new, mandatory Wi-Fi type. It is assumed that PoC-vit has an address in a private domain which may be resolved only via Wi-Fi. Therefore, the PoC-vit indicates a mandatory mapping to IF-A-wifi. When B receives communications for A, B identifies IF-A-wifi with its own, currently unused, interface IF-B-wifi, based on the interfaceA object available via registration. B also connects to A via IF-B-wifi and it populates the respective interface and access tables as shown in FIG. 17 and FIG. 18.

TABLE 8A

SL-B Neighbor Access List

| Neighbor | Interface ID | Address | Interface type | Neighbor Interface ID |
|---|---|---|---|---|
| SL-A-ID | IF-B-bt | PoC-A1 | Bluetooth | IF-A-bt |
| SL-A-ID | IF-B-wifi | PoC-A2 | Wi-Fi | IF-A-wifi |
| SL-C-ID | IF-B-cell | PoC-C1 | Cell | IF-C-cell |

TABLE 8B

SL-B Interface Status Table

| interface | Status | Next hop | Address | Destination Scope |
|---|---|---|---|---|
| IF-B-bt | Active | SL-A-ID | PoC-A1 | SL_A, Trk |
| IF-B-cell | Active | SL-C-ID | PoC-C1 | SL_C, forwarding |
| IF-B-wifi | Active | SL-A-ID | PoC-A2 | SL_A, Vit |

The Wi-Fi interface status shows an active interface with Vit in the destination scope B, although there have been no communications to Vit yet. However, since the interface has been activated, communications to-from Vit will find this interface in an active state, and the tables show awareness that this interface is preferred for it. The preference is known at both A and B by the presence in the "Interface Scope" of IF-A-wifi entry in the interfaceA configuration object.

TABLE 9A

SL-A Neighbor Access List

| Neighbor | Interface ID (local) | Address | Interface type | Neighbor Interface ID |
|---|---|---|---|---|
| SL-B-ID | IF-A-bt | PoC-B1 | Bluetooth | IF-B-bt |
| SL-B-ID | IF-A-wifi | PoC-B2 | Wi-Fi | IF-B-wifi |

TABLE 9B

SL-A Interface Status Table

| interface | Status | next hop | IP-Address | Destination Scope |
|---|---|---|---|---|
| IF-A-bt | Active | SL-B-ID | PoC-B1 | SL_B, Forwarding |
| IF-A-wifi | Active | SL-B-ID | PoC-B2 | SL_B, Forwarding |

Another example is activating new A-B new, type not mandatory. In the step above, if PoC-vit2 is mapped to any available interface, B tries first to address A via IF-B-bt which is already connected to A, and assuming success, may continue the communication via this interface. The corresponding tables are shown below.

TABLE 10A

SL B Neighbor Lists

| Neighbor | Interface ID(local) | Address | Interface type | Neighbor Interface ID |
|---|---|---|---|---|
| SL-A-ID | IF-B-bt | PoC-A1, PoC-A2 | Bluetooth | IF-A-bt |
| SL-C-ID | IF-B-cell | PoC-C1 | Cell | IF-C-cell |

TABLE 10B

SL B Interface Status Table

| interface | Status | Next hop | Address | Status | Destination Scope |
|---|---|---|---|---|---|
| IF-B-bt | Active | SL-A-ID | PoC-A1 | Active | SL_A, Trk |
| IF-B-cell | Active | SL-C-ID | PoC-C1 | Active | SL_C, forwarding |
| IF-B-wifi | Inactive | | | Inactive | |

An Interface Mapping Functionality may provide services via several methods and procedures. A first method may be used by the Service Layer to resolve potential configuration conflicts resulting from the use of multiple interfaces in multiple domains. The process of building Interface Status and Neighbor Access Tables allows the addresses to be resolved using an associated, rather than inferred interface information, as provided by the newly introduced Configuration Objects.

The same Configuration Objects allow network connectivity preferences to be differentiated by applications. The IMF method for message processing described later in this section provides an embodiment for complex communication management services in MIF node environments which may be provided at the Service Layer.

A special embodiment is described in section 6 of the oneM2M architecture, Providing Point of Contact Configuration Objects to content sharing resources. In conjunction with the method processing methods, this enables the Service Layer to offer methods for setting preferences for underlying network connectivity use when accessing individual resources, independent of node-scoped policies.

Figure 14:
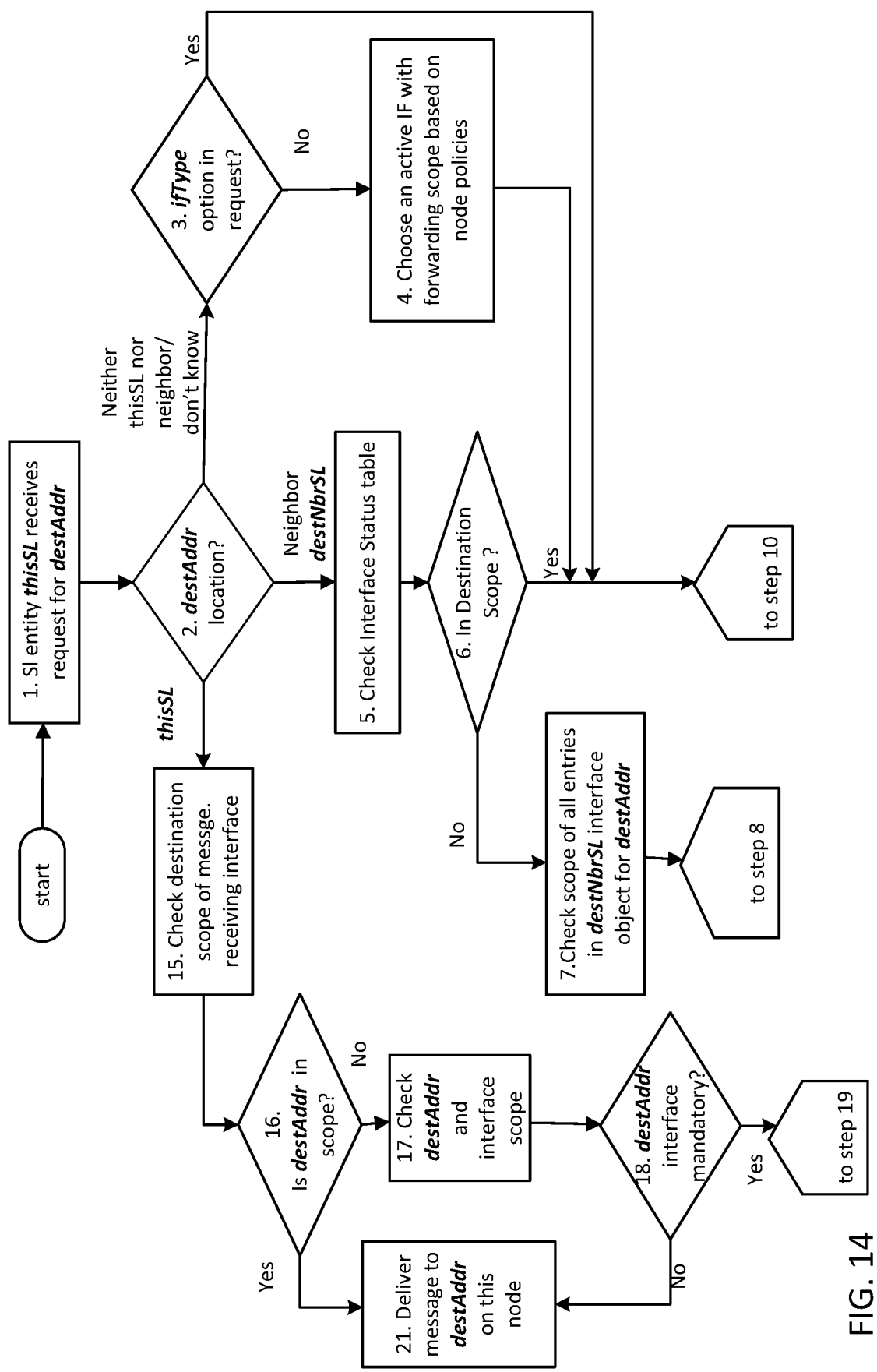
FIG. 14 is a flow diagram of a portion of an example IMF method for message processing.
Figure 15:
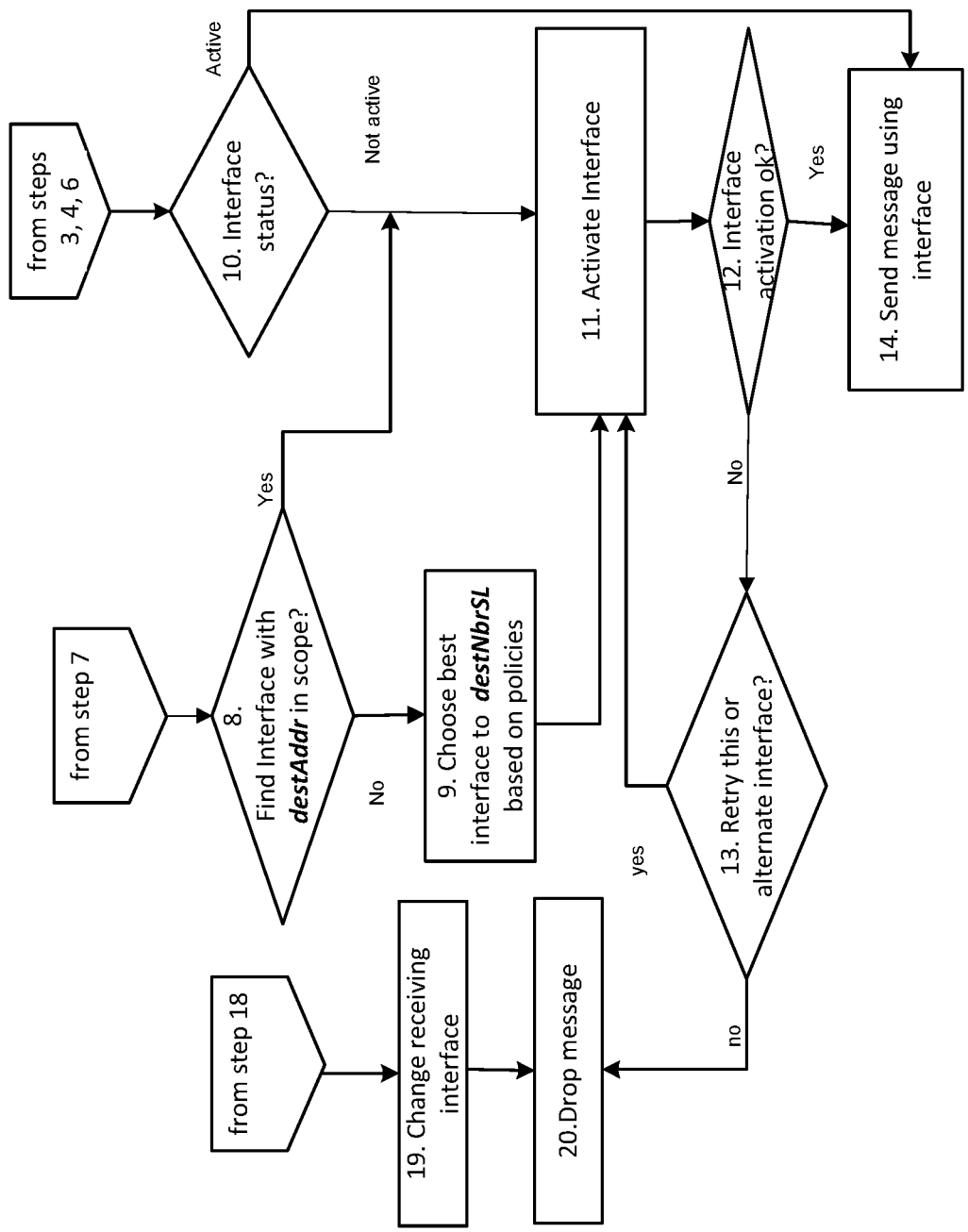
FIG. 15 is a flow diagram of a further portion of the example IMF method for message processing of FIG. 14.

FIGS. 14 and 15 illustrate an example IMF method for message processing. At the start, it is assumed that registrations with all the neighbors have been performed and the neighbor list, Neighbor Access tables, and Interface Status tables have been populated. In step 1, a new message addressed to destAddr is received.

In step 2, destAddr is evaluated, and if hosted by the receiving SL, the method proceeds to step15. Else, if it is hosted by a neighbor destNbrSL from the neighbor list, the method proceeds to step 5. Otherwise, the entity is unknown, and method proceeds to step 3.

In step 3, the system checks whether a preferred interface type is indicated via interfaceType parameter in the request. If yes go to step 10, else go to step 4.

In step 4, the system chooses an active interface with forwarding scope based on local node policies for forwarding, then goes to step 10.

In step 5, the system checks the Interface Status table for an interface to destNbrSL with destAddr in destination scope, then goes to step 6. The scope match is based on the longest matching prefix of destAddr to addresses in scope.

In step 6, if an interface with destAddr in destination scope is found, the method proceeds to step 10. Else go to step 7.

In step 7, the system evaluates the scope in all entries of the Interface Object for destNbrSL, then goes to step 8.

In step 8, if there is an interface of the destNbrSL with destAddr in scope, then the method proceeds to step 11, activating interface. Otherwise the method proceeds to step 9.

In step 9, the destAddr is hosted on the destNbrSL node, but has not been mapped to any of its interfaces, as checked in both status tables and the neighbor's Interface Object. The system selects an interface with destNbrSL as next hop, then goes to step 11, activating the interface chosen.

In step 10, the system checks the chosen interface status in the Interface Status table. If it is active, it goes to step 12, else it goes to step 11.

In step 11, the system activates the chosen interface, then go to step 12.

In step 12, if the activation of the chosen interface is successful, the method proceeds to step 14; else it goes to step 13.

In step 13, where activation of a chosen interface activation is unsuccessful, policies applying to this message may allow the interface activation to be retried, or try a new choice of interface, in which case the method proceeds again to step 11. Otherwise, the message is dropped by going to step 20.

In step 14, the system sends the message using the chosen interface. This concludes the non-local delivery.

In step 15, for a destAddr hosted by the receiving SL, the system checks whether the destAddr is in scope of the Interface Object entry for the interface that received the incoming message, then goes to step 16.

In step 16, if the message was delivered with an interface with destAddr in the scope, the method proceeds to step 21. Else it goes to step 17.

In step 17, the system checks destAddr interface mapping and then goes to step 18.

In step 18, if destAddr interface mapping is mandatory, the method proceeds to step 19. Otherwise, the method proceeds to delivering the message to the destAddr in step 21.

In step 19, since the message was not received with the mandatory interface, the system corrects the scope of the Interface Object entry corresponding to the incoming message interface, and updates the object at the neighbors to insure that addressing destAddr via this interface does not repeat, before proceeding to step 20.

In step 20, the system drops the incoming message, ending processing.

In step 21, the system delivers the message locally to the destAddr, ending processing.

Figure 16:
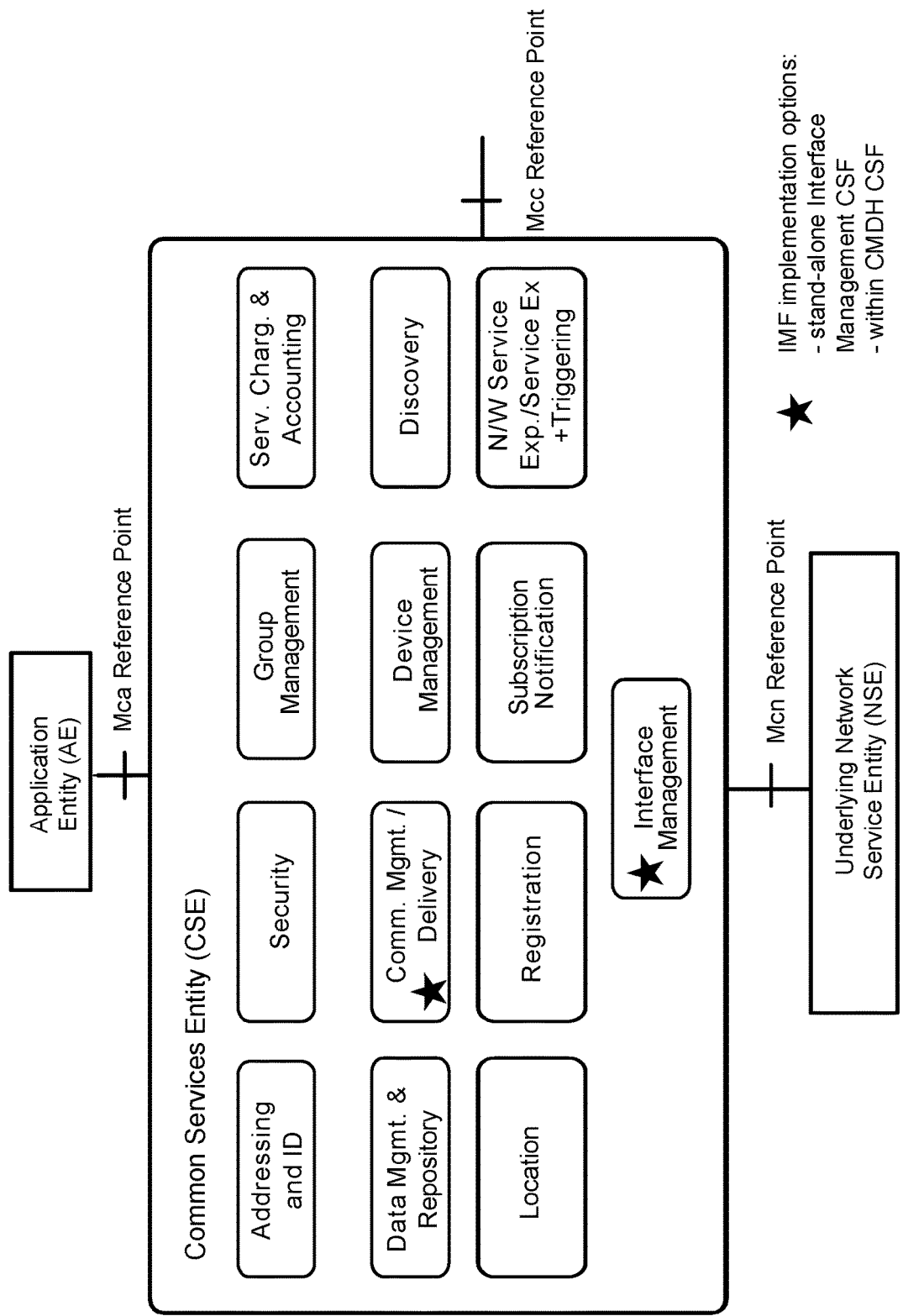
FIG. 16 shows an example oneM2M Service Layer entity, referred to as a Capability Services Entity (CSE), with a set of supported CSFs and an Interface Management Function (IMF).

The methods and apparatuses described herein may be embodied using the oneM2M architecture or in other systems and frameworks. oneM2M-TS-0001, the oneM2M Functional Architecture-V2.6.0., includes Common Services Functions (CSFs) such as the Communication Management and Delivery Handling (CMDH) function. FIG. 16 shows a oneM2M Service Layer entity, referred to as a Capability Services Entity (CSE), with a set of supported CSFs and the Interface Management Function (IMF) described herein.

The IMF may be implemented as a standalone capability. Alternatively, the functionality of the IMF may be used to extend the current CMDH CSF. In both cases the IMF may be supported by oneM2M.

Individual CSFs in the oneM2M Resource Oriented Architecture (RoA) support sets of resources that serve as their respective interface. These resources are uniquely addressable using Universal Resource Identifier (URI) s and may be manipulated via RESTful methods such as Create, Retrieve, Update, and Delete. The new Configuration Objects and parameters proposed in this disclosure may be embodied in oneM2M as new resources and/or attributes.

FIG. 17 shows an example oneM2M interface resource with a set of a set of attributes as described in Table 11.

TABLE 11

<interface> resource attributes

| Attribute Name | Multiplicity | Description |
| --- | --- | --- |
| interfaceID | 1 | ID of the interface within the set maintained for a specific node. |
| interfaceScope | 1 | Contains a list of the addressed entities which are associated with this interface, e.g., applications on the node which indicate preference for this interface. Entries may include "this_CSE" and "forwarding" for messages targeting other entities. If unspecified any transit messages and those targeting local resources may use this interface. |
| interfaceType | 0 . . . 1 | Indicator of logical interface type, e.g., Cellular, Bluetooth etc. a choice from a specified set of values. The list may include qualifiers such as "lowest cost", "highest security", "lowest power", etc. If it is not populated the value may be derived from (but is not equal to) the Target Network parameter below. |
| interfaceContext | 0 . . . 1(L) | Context for the interface selection for, may include e.g., to/from address, available time etc. each of which needs to be matched for the interface to be used. Depending on implementation, a single entry may be defined as a list of several parameters which may be used together for context match evaluation e.g., min/max battery level, battery cost measure, etc. The context contains also information about the optionality of each context condition. (optional) |

TABLE 11-continued

<interface> resource attributes

| Attribute Name | Multiplicity | Description |
| --- | --- | --- |
| targetNetwork | 0 . . . 1(L) | The target network parameter defines which Underlying Network is used though the logical interface. This may be a list (for logical interfaces abstracting multiple UN). If unspecified, IMF may not be capable of making decisions based on UN characteristics, but may still provide binding. (optional) |
| UNaccessInfoLink | 0 . . . 1(L) | Link to other objects/resources with information to be used for accessing the UN, such as bandwidth, latency, packet loss, security parameters, etc. This may be a list, if multiple target networks are specified in the preceding parameter, in which case the list order should correspond. (optional) |
| domainName | 0 . . . 1 (L) | Name of the domain(s) used for resolving the address information, may be a list. (optional) |
| DNSserver | 0 . . . 1 (L) | The DNS Server(s) used for resolving the address information, if not expressed as IP address. It may be a list. (optional) |
| domainAccessIndicator | 0 . . . 1 | Indicates if the domain requires access though the listed DNS server(s) exclusively (e.g., within private domains). This parameter may be used for deciding if bindings should be mandatory or not, or if the DNS server entry may be updated/changed. If not specified a default convention must be adopted, e.g., by default the DNS Servers specified in other entries of the interface list may be tried to resolve address resolution issues. |
| OSId | 0 . . . 1 | Operating system identifier. The format may be an Universally Unique IDentifier (UUID) as specified in IETF RFC 4122 (optional) |
| PvD | 0 . . . 1 | Link to a provided PvD which may be communicated via lower layer API. See IETF RFC7556. (optional) |
| policyLinks | 0 . . . 1 (L) | Link to a provisioned policy e.g., CMDH (optional) |
| multipleConfigurationRules | 0 . . . 1 | Rules for the use of multiple configurations such as explicit, PvD, CMDH policy, etc. This may be implemented as a set of several parameters indicating further rules about how a merge may be accomplished. At its simplest it provides rules about which configuration to be used in case of multiple setting: PvD, CMDH or explicit parameters. (optional) |

In the oneM2M Service Layer, communications with CSEs and AEs use the IP-level addresses in the pointOfContact attribute of the <CSEbase>/<remoteCSE> and <AE> resources, respectively. This may be improved by the use of a new Point of Contact <PoC> resource which, in addition to IP level addressing, would include interface use preferences, context and priorities as shown in FIG. 18 and described in Table 12.

TABLE 12

<PoC> resource attributes

| Attribute Name | Multiplicity | Description |
| --- | --- | --- |
| Point of Contact ID | 0 . . . 1 | ID of the Point Of Access configuration/object, for ease of reference (optional) |
| pointOfAccess | 0 . . . 1 (L) | This is an existing oneM2M parameter. Address (e.g., FQDN, IP) for communicating with the entity or resource, which is resolvable to an IP-level address. A list of addresses may be provided, in which case they may be used in the order provided, should any fail to resolve. |
| associatedInterface | 0 . . . 1(L) | Link to an <interface> resource (or its interfaceID) of the host, indicating the interface preference. If only one entry is provided, the association is mandatory. If multiple entries are provided the order of appearance in the list is the preference order. If no entries are given any interface may be used, according to other policies. |
| PoCcontext | 0 . . . 1 | Context for the use of the address, it may be implemented as a list of parameters for a variety of context types. For example, it might provide schedule information, traffic patterns, stationary indication, etc. The context contains also information about the optionality of each context condition. (optional)<br>Note: in oneM2M this attribute may provide links to other existing resources e.g., <trafficPattern>, <schedule> |
| PoCpriority | 0 . . . 1 | Priority of PoA among the set. Lowest number has highest priority. If not provided the default is a high number/low priority, and the default for all entries should be the same. (optional) |

Existing oneM2M resources such as <CSEBase> and <remoteCSE> may support multiple interfaces by providing a list of <interface> resources as child resources. The interface list may also be implemented as child resources of the <node> resource residing at the respective CSEs.

Figure 19:
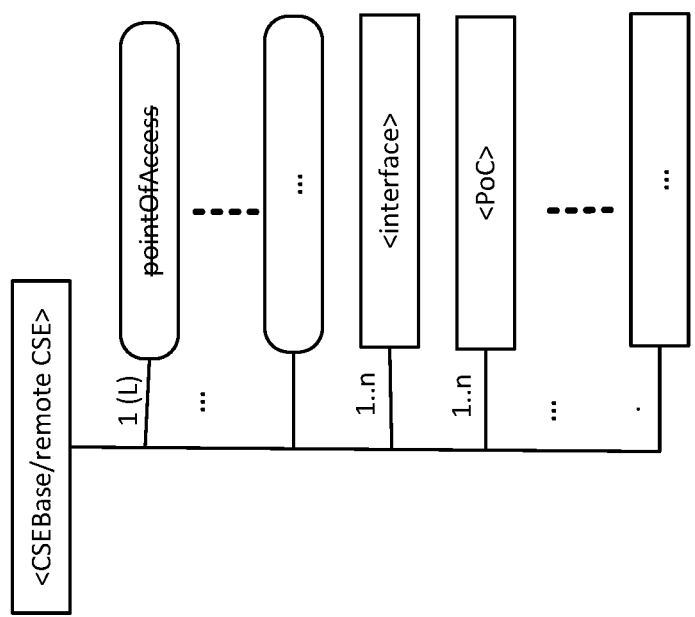
FIG. 19 shows an example <interface> resource at the CSE.

FIG. 19 is an example <interface> resource at the CSE, where not all attributes/sub-resources are shown. In FIG. 19, the pointOfAccess attribute of <CSEbase> or <remoteCSE> is no longer provided at this location in the tree structure. The equivalent information is provided via the <PoC> resources, with the added benefit of being able to bind each of the addresses with an <interface> resource.

An equivalent embodiment may maintain the existing list in the pointOfAccess attribute, and provide other ways of linking the remaining <PoC> information with each address. For example, the <PoC> resource may instead contain a pointOfAccessID, with the IDs indicating the list order in the pointOfAccess attribute, which would be kept at the higher level in the tree structure.

Figure 20:
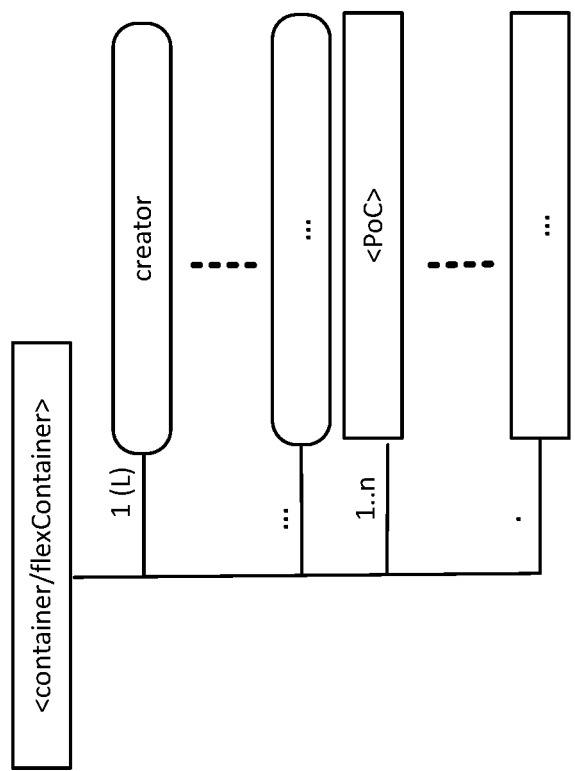
FIG. 20 shows an example <container> or <flexContainer> resource.

The <PoC> resource may be also used to provide access information for content-sharing resources, e.g., <container> or <flexContainer>. In this case <PoC> becomes a child resource of the respective resource, as shown in FIG. 20.

Figure 21:
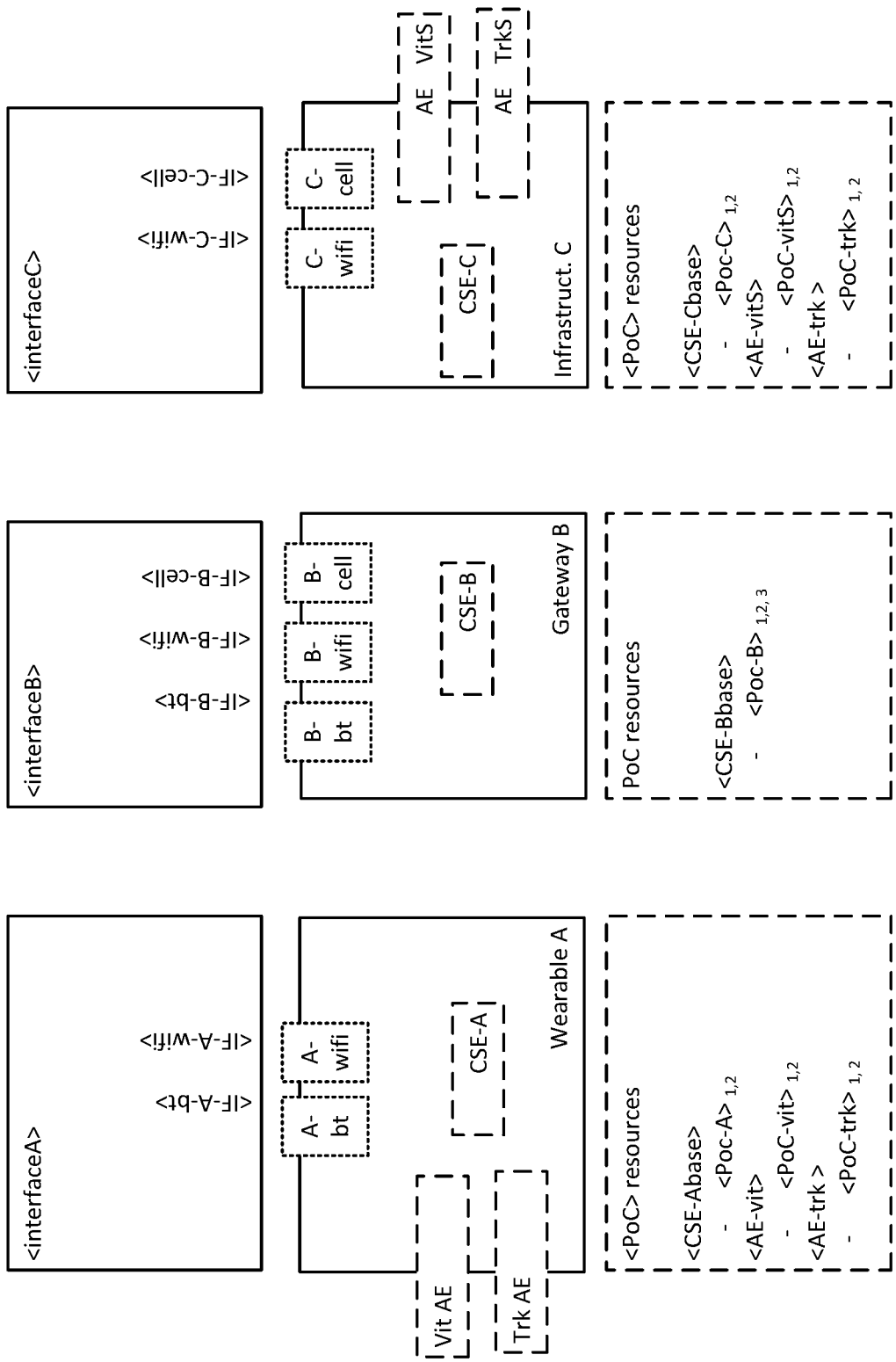
FIG. 21 shows oneM2M entities and resources for the situation described, e.g., in reference to FIGS. 8, 10, and 11.

FIG. 21 shows oneM2M entities and resources for the use case described in reference to, e.g., FIGS. 8, 10, and 11. Each application may access the <interface> resource at the CSEs on which it resides. As such, the application may provide setting configuration based on this information, or might have internal rules for mapping it <PoC> entries to the available interfaces.

Figure 22:
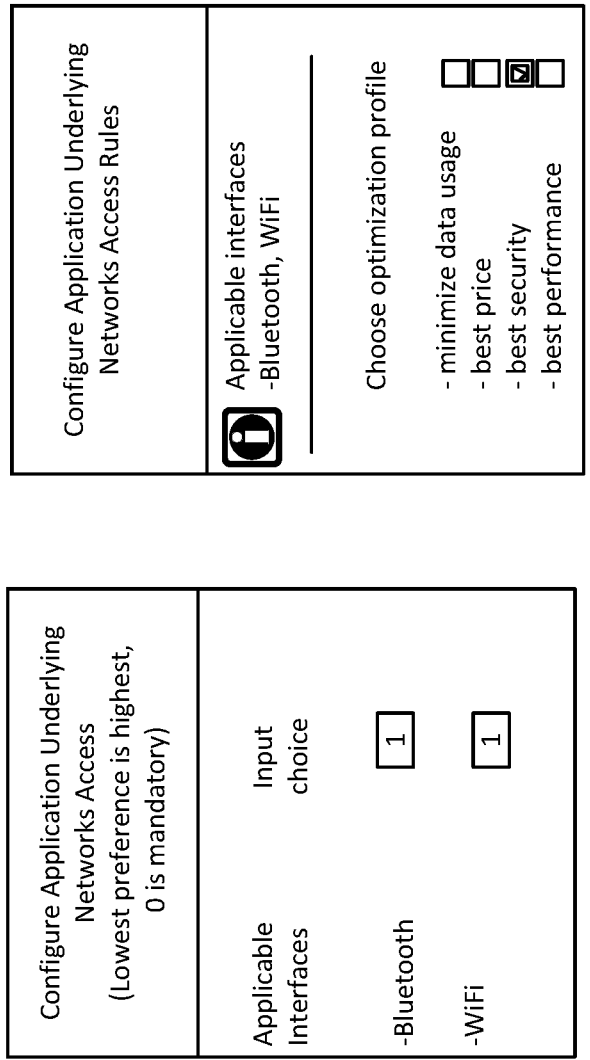
FIG. 22 shows two example graphical user interface (GUI) screens for inputting IMF functionality preferences.

FIG. 22 presents two graphical user interface (GUI) screens for inputting IMF functionality preferences. In the screen to the left, the user is prompted to provide relative priorities for the allowed interfaces. In the screen to the right, the user chooses rules, such as "best security", which are interpreted by IMF. The IMF, based on the available interfaces, then chooses an interface based on the user preferences.

When an application provides GUI options as shown in FIG. 22, the application uses as input the entries in <interface> resource. The entries may be filtered based on node policies, e.g., in some cases only two out of three configured interfaces may be exposed to a specific application. The application then uses the inputs and updates its <PoC>e.g., associatedInterface, PoCpriority parameters.

For optimization profiles such as shown in the screen to the right in FIG. 22, the profile may be translated in PoC context information, based on which the IMF then updates the associatedInterface and PoCpriority. In both of these cases, once the associatedInterface parameter is updated, the IMF or the application may update the scope of each applicable interface to include the application and its resources.

Figure 23:
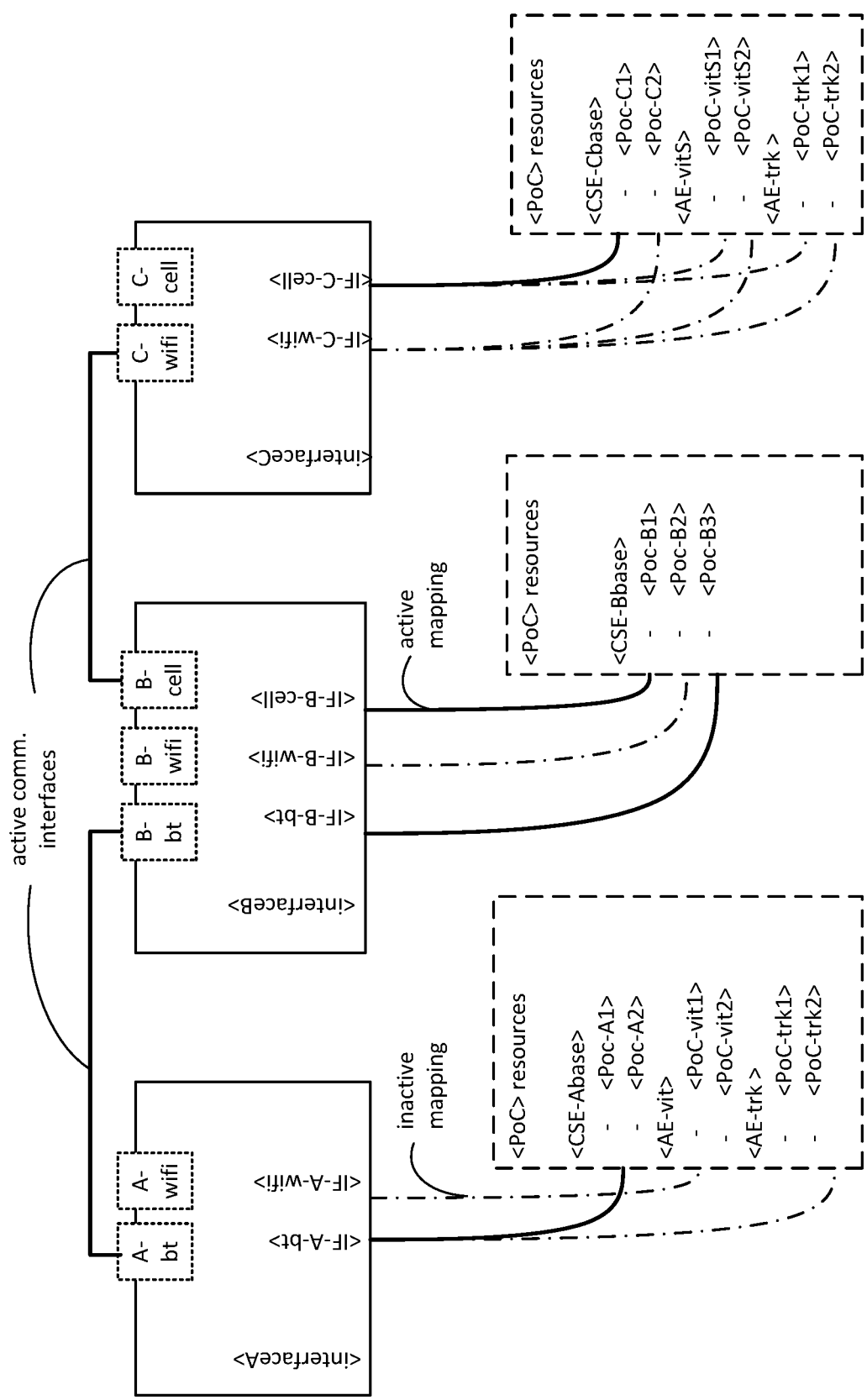
FIG. 23 illustrates an example of interface mapping.

FIG. 23 illustrates interface mapping. After all the registrations, with the preferences set as described in reference to Tables 5, 6, and 7, the active interfaces between the nodes used at registration are cellular for the IN-MN communications and Bluetooth for the MN-ASN communications.

Figure 24:
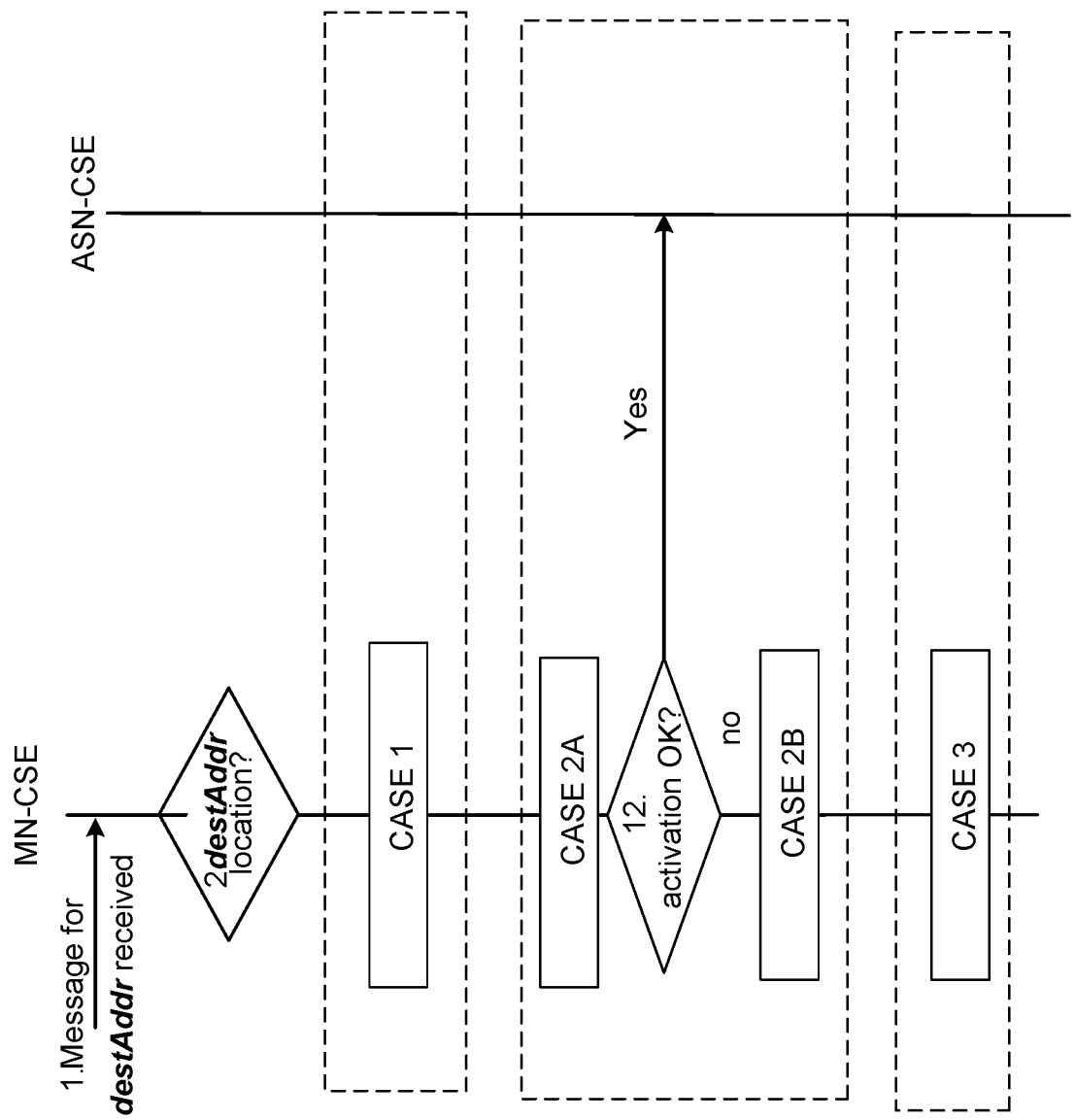
FIG. 24 shows an example IMF process flow at an MN-CSE for an incoming message.

FIG. 24 shows an example IMF process flow at an MN-CSE for an incoming message, using the topology and nomenclature from the use case. IMF uses first the destination to determine if the message targets a local resource, one located on a neighbor or on a different entity, to be routed via a neighbor. The newly introduced message parameter interfaceType, as well as the mapping tables with interface status and neighbor access information are used for processing the messages to be resent to other entities.

For messages targeting local resources, the interface information enables checking that the interface used for the incoming message corresponds to the targeted entity choice. The flow shown in FIG. 24 corresponds to the method described in reference to FIGS. 14 and 15. Referring to FIG. 24, in step 1, the MN-CSE receives a message destined for destAddr.

In step 2, the MN-CSE checks destAddr against its tables. Processing proceeds in one of three ways, depending on the value of destAddr.

In case 1, where destAddr is neither on MN-CSE nor ASN-CSE, processing occurs according to steps 3 and 4 of FIGS. 14 and 15. An interface is chosen based on ifType, or based on an active IF with forwarding scope based on node policies message parameter. Processing then proceeds to step 10 of FIG. 15.

In case 2A of FIG. 24, destAddr is neither on ASN-CSE, nor is processing continuation from case 2 above. The MN-CSE performs perform Steps 6-13 in FIGS. 14 and 15 to choose an interface to the neighbor destNbrSL=ASN-CSEbase, and to forward the message. Activations of selected interfaces may be needed, and may be performed accordingly.

In step 12 of FIG. 24, the MN-CSE checks whether interfaces are properly activated. If yes, in step 14, a message is sent on a chosen interface.

In case 2B of FIG. 24, activation is not complete, and the MN-CSE performs steps 13, 11, 12, and 14 of FIG. 15 to retry interface activation. Processing terminates after sending the message on the chosen interface, or dropping the message if an interface is not available.

In case 3 of FIG. 24, destAddr is on the MN-CSE. The MN-CSE perform Steps 15-20 in FIGS. 14 and 15 to deliver the message to the destAddr on the receiving node, or to drop the message if undeliverable.

The various techniques described herein may be implemented in connection with hardware, firmware, software or, where appropriate, combinations thereof. Such hardware, firmware, and software may reside in apparatuses located at various nodes of a communication network. The apparatuses may operate singly or in combination with each other to effect the methods described herein. As used herein, the terms "apparatus," "network apparatus," "node," "device," and "network node" may be used interchangeably.

Figure 25:
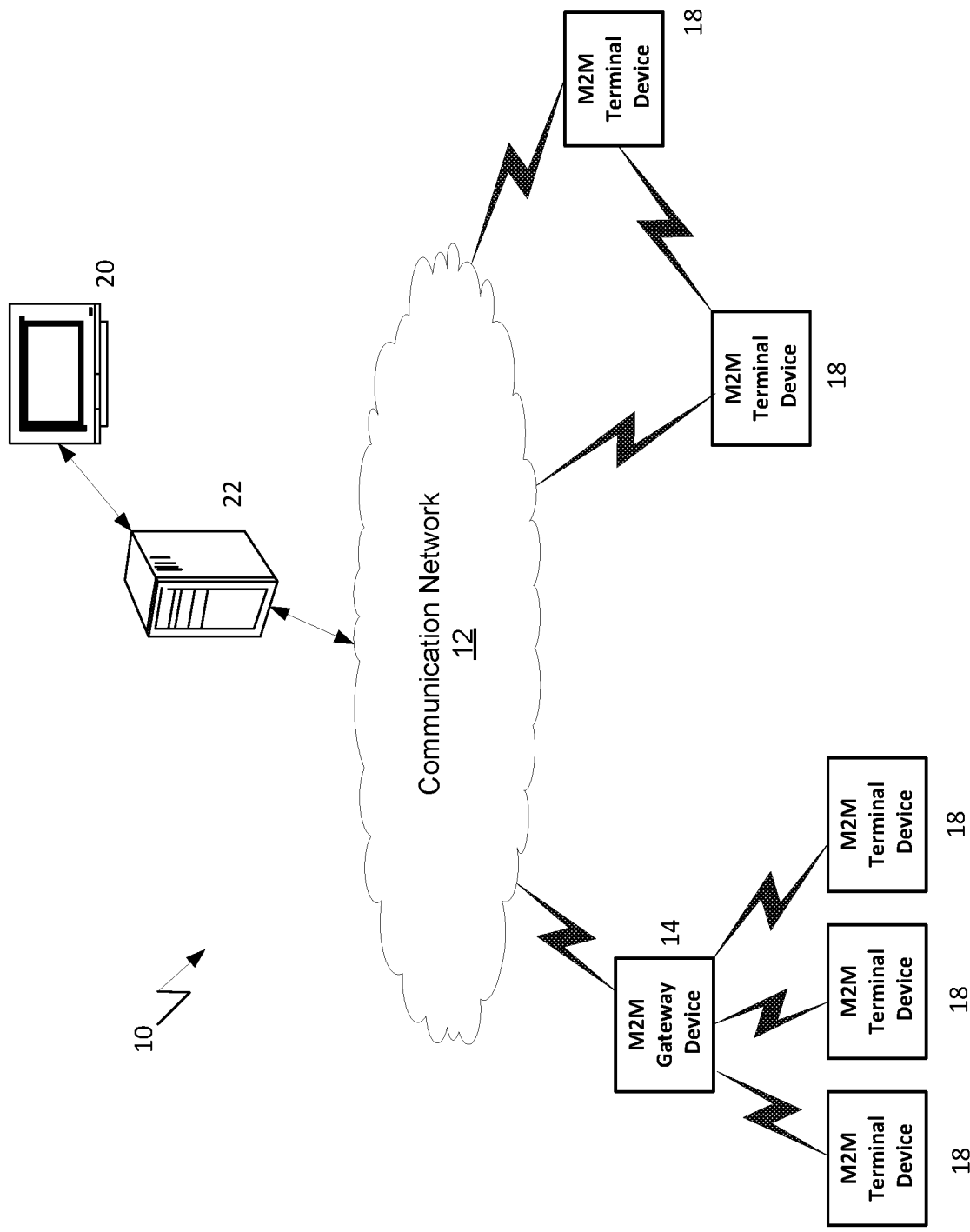
FIG. 25 is a system diagram of an example machine-to-machine (M2M), Internet of Things (IoT), or Web of Things (WoT) communication system in which one or more disclosed embodiments may be implemented.

FIG. 25 is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, M2M gateway, M2M server, or M2M service platform may be a component or node of the IoT/WoT as well as an IoT/WoT Service Layer, etc. Any of the client, proxy, or server devices illustrated in any of FIGS. 1-4, 7-13, 16, 21, 23, 25-28 may comprise a node of a communication system, such as the ones illustrated in FIG. 1-4, 7-13, 16, 21, or 25-26.

As shown in FIG. 25, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may be comprised of multiple access networks that provide content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 25, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain and Infrastructure Domain may both comprise a variety of different nodes (e.g., servers, gateways, device, and the like) of the network. For example, the Field Domain may include M2M gateways 14 and devices 18. It will be appreciated that any number of M2M gateway devices 14 and M2M devices 18 may be included in the M2M/IoT/WoT communication system 10 as desired. Each of the M2M gateway devices 14 and M2M devices 18 are configured to transmit and receive signals, using communications circuitry, via the communication network 12 or direct radio link. A M2M gateway 14 allows wireless M2M devices (e.g., cellular and non-cellular) as well as fixed network M2M devices (e.g., PLC) to communicate either through operator networks, such as the communication network 12 or direct radio link. For example, the M2M devices 18 may collect data and send the data, via the communication network 12 or direct radio link, to an M2M application 20 or other M2M devices 18. The M2M devices 18 may also receive data from the M2M application 20 or an M2M device 18. Further, data and signals may be sent to and received from the M2M application 20 via an M2M Service Layer 22, as described below. M2M devices 18 and gateways 14 may communicate via various networks including, cellular, WLAN, WPAN (e.g., Zigbee, 6LoWPAN, Bluetooth), direct radio link, and wireline for example. Exemplary M2M devices include, but are not limited to, tablets, smart phones, medical devices, temperature and weather monitors, connected cars, smart meters, game consoles, personal digital assistants, health and fitness monitors, lights, thermostats, appliances, garage doors and other actuator-based devices, security devices, and smart outlets.

Figure 26:
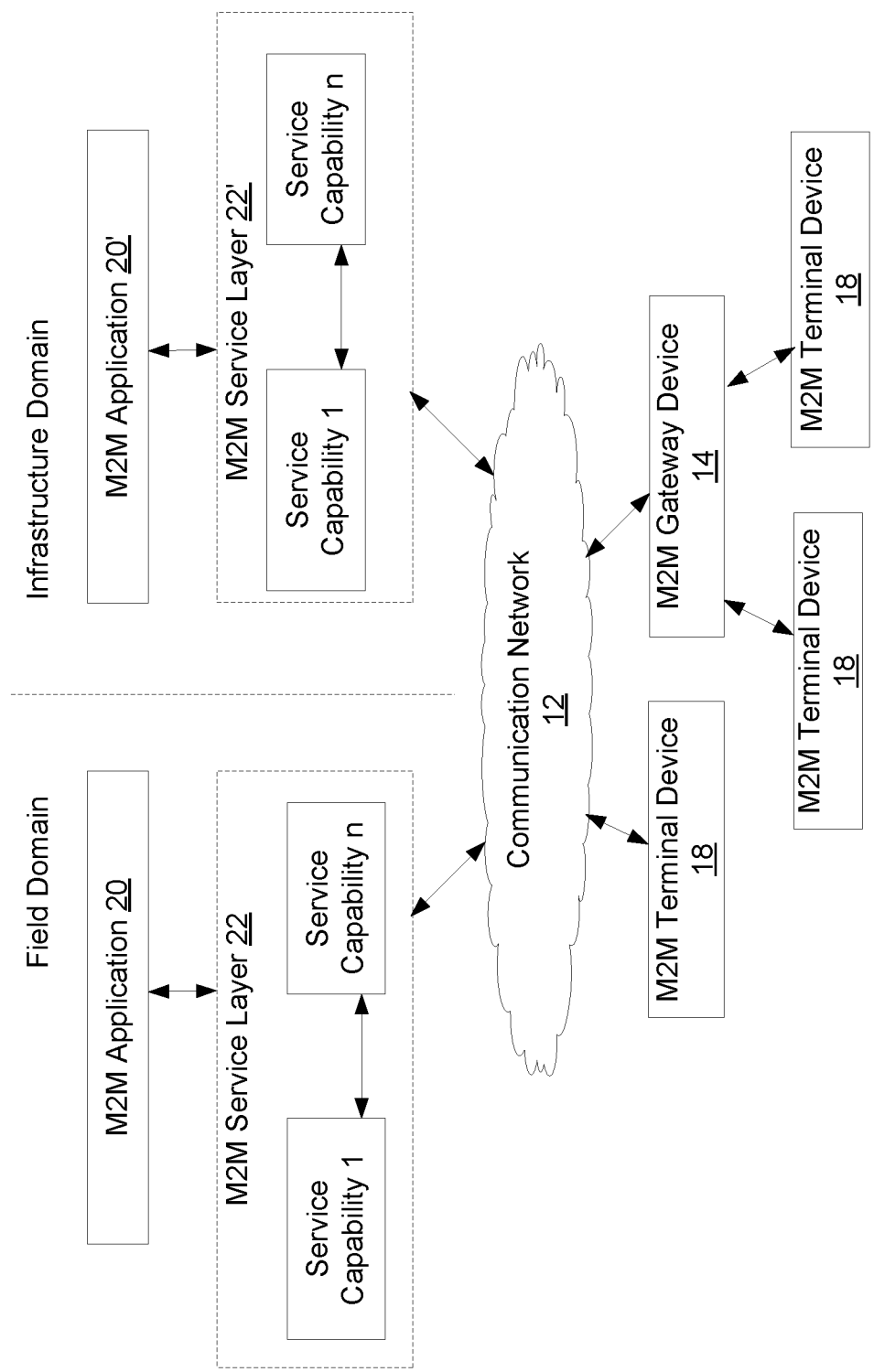
FIG. 26 is a system diagram of an example architecture that may be used within the M2M/IoT/WoT communications system illustrated in FIG. 25.

Referring to FIG. 26, the illustrated M2M Service Layer 22 in the field domain provides services for the M2M application 20, M2M gateways 14, and M2M devices 18 and the communication network 12. It will be understood that the M2M Service Layer 22 may communicate with any number of M2M applications, M2M gateways 14, M2M devices 18, and communication networks 12 as desired. The M2M Service Layer 22 may be implemented by one or more nodes of the network, which may comprise servers, computers, devices, or the like. The M2M Service Layer 22 provides service capabilities that apply to M2M devices 18, M2M gateways 14, and M2M applications 20. The functions of the M2M Service Layer 22 may be implemented in a variety of ways, for example as a web server, in the cellular core network, in the cloud, etc.

Similar to the illustrated M2M Service Layer 22, there is the M2M Service Layer 22' in the Infrastructure Domain. M2M Service Layer 22' provides services for the M2M application 20' and the underlying communication network 12 in the infrastructure domain. M2M Service Layer 22' also provides services for the M2M gateways 14 and M2M devices 18 in the field domain. It will be understood that the M2M Service Layer 22' may communicate with any number of M2M applications, M2M gateways and M2M devices. The M2M Service Layer 22' may interact with a Service Layer by a different service provider. The M2M Service Layer 22' may be implemented by one or more nodes of the network, which may comprise servers, computers, devices, virtual machines (e.g., cloud computing/storage farms, etc.) or the like.

Referring also to FIG. 26, the M2M Service Layers 22 and 22' provide a core set of service delivery capabilities that diverse applications and verticals may leverage. These service capabilities enable M2M applications 20 and 20' to interact with devices and perform functions such as data collection, data analysis, device management, security, billing, service/device discovery, etc. Essentially, these service capabilities free the applications of the burden of implementing these functionalities, thus simplifying application development and reducing cost and time to market. The Service Layers 22 and 22' also enable M2M applications 20 and 20' to communicate through various networks such as network 12 in connection with the services that the Service Layers 22 and 22' provide.

The M2M applications 20 and 20' may include applications in various industries such as, without limitation, transportation, health and wellness, connected home, energy management, asset tracking, and security and surveillance. As mentioned above, the M2M Service Layer, running across the devices, gateways, servers and other nodes of the system, supports functions such as, for example, data collection, device management, security, billing, location tracking/geofencing, device/service discovery, and legacy systems integration, and provides these functions as services to the M2M applications 20 and 20'.

Generally, a Service Layer, such as the Service Layers 22 and 22' illustrated in FIG. 26, defines a software middleware layer that supports value-added service capabilities through a set of Application Programming Interfaces (APIs) and underlying networking interfaces. Both the ETSI M2M and oneM2M architectures define a Service Layer. ETSI M2M's Service Layer is referred to as the Service Capability Layer (SCL). The SCL may be implemented in a variety of different nodes of the ETSI M2M architecture. For example, an instance of the Service Layer may be implemented within an M2M device (where it is referred to as a device SCL (DSCL)), a gateway (where it is referred to as a gateway SCL (GSCL)) and/or a network node (where it is referred to as a network SCL (NSCL)). The oneM2M Service Layer supports a set of Common Service Functions (CSFs) (i.e., service capabilities). An instantiation of a set of one or more particular types of CSFs is referred to as a Common Services Entity (CSE) which may be hosted on different types of network nodes (e.g., infrastructure node, middle node, application-specific node). The Third Generation Partnership Project (3GPP) has also defined an architecture for machine-type communications (MTC). In that architecture, the Service Layer, and the service capabilities it provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the oneM2M architecture, or in some other node of a network, an instance of the Service Layer may be implemented as a logical entity (e.g., software, computer-executable instructions, and the like) executing either on one or more stand-alone nodes in the network, including servers, computers, and other computing devices or nodes, or as part of one or more existing nodes. As an example, an instance of a Service Layer or component thereof may be implemented in the form of software running on a network node (e.g., server, computer, gateway, device or the like) having the general architecture illustrated in FIG. 27 or FIG. 28 described below.

Further, the methods and functionalities described herein may be implemented as part of an M2M network that uses a Service Oriented Architecture (SOA) and/or a Resource-Oriented Architecture (ROA) to access services.

Figure 27:
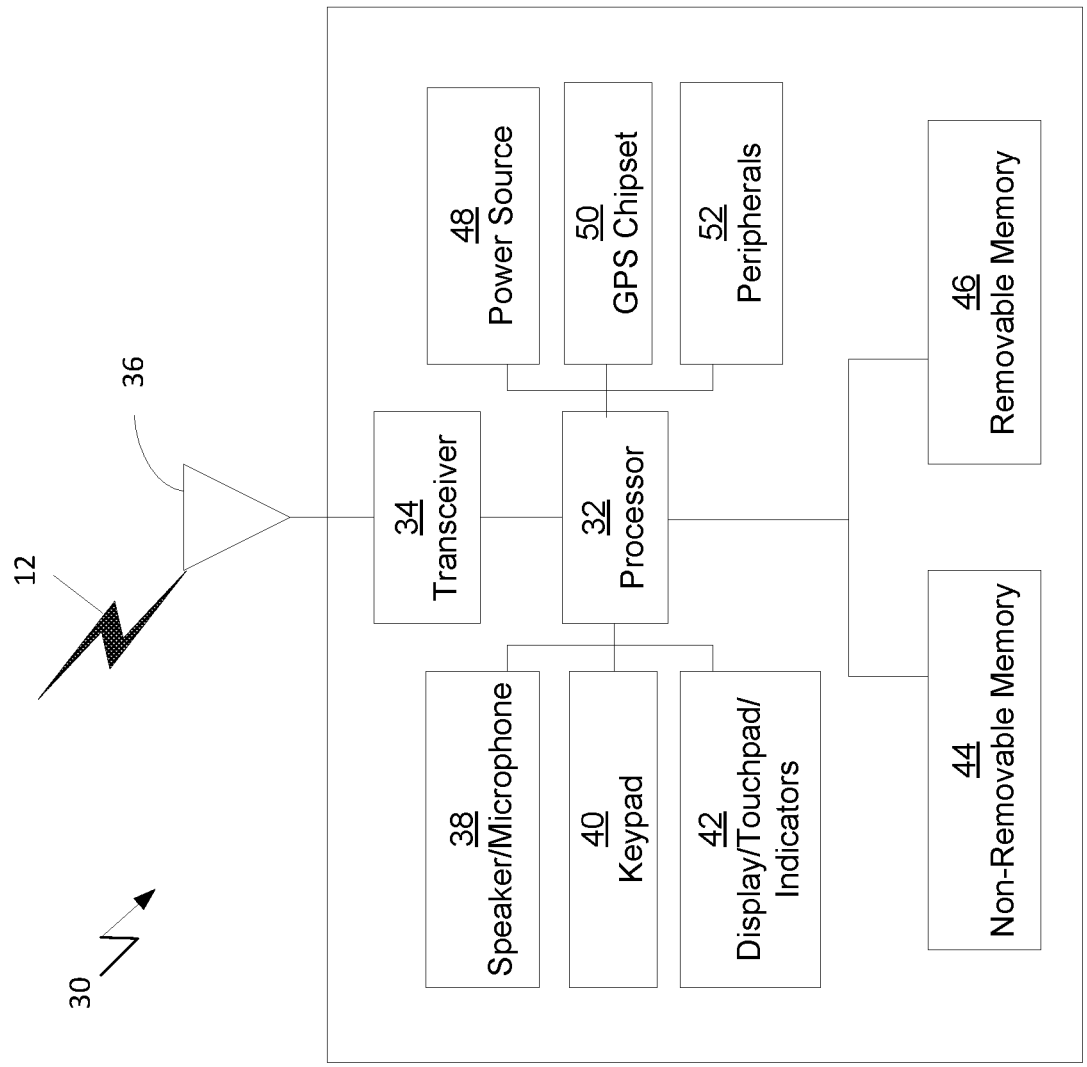
FIG. 27 is a system diagram of an example communication network node, such as an M2M/IoT/WoT device, gateway, or server that may be used within the communications system illustrated in FIGS. 25 and 26.

FIG. 27 is a block diagram of an example hardware/software architecture of a node of a network, such as one of the clients, servers, or proxies illustrated in FIG. 7-13, 16, or 21-28, which may operate as an M2M server, gateway, device, or other node in an M2M network such as that illustrated in FIG. 1-4, 7-13, 16, 21, 23, or 25-26. As shown in FIG. 27, the node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. It will be appreciated that the node 30 may include any sub-combination of the foregoing elements while remaining consistent with an embodiment. This node may be a node that implements multiple interface support, e.g., in relation to the methods described in reference to FIGS. 12, 14, 15, and 24, or the data structures of FIG. 5, 6, 10, 11, 13, 17-21, or 23, Tables 3-12, or in a claim.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

As shown in FIG. 27, the processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected. In particular, the processor 32 may control the communication circuitry in order to perform the multiple interface support steps herein, e.g., in relation to FIG. 12, 14, 15, or 24, or in a claim. While FIG. 27 depicts the processor 32 and the transceiver 34 as separate components, it will be appreciated that the processor 32 and the transceiver 34 may be integrated together in an electronic package or chip.

The transmit/receive element 36 may be configured to transmit signals to, or receive signals from, other nodes, including M2M servers, gateways, device, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 27 as a single element, the node 30 may include any number of transmit/receive elements 36. More specifically, the node 30 may employ MIMO technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as UTRA and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer. The processor 32 may be configured to control lighting patterns, images, or colors on the display or indicators 42 to reflect the status of an M2M Service Layer session migration or sharing or to obtain input from a user or display information to a user about the node's session migration or sharing capabilities or settings. In another example, the display may show information with regard to a session state.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. It will be appreciated that the node 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include various sensors such as an accelerometer, biometrics (e.g., finger print) sensors, an e-compass, a satellite transceiver, a sensor, a digital camera (for photographs or video), a universal serial bus (USB) port or other interconnect interfaces, a vibration device, a television transceiver, a hands free headset, a Bluetooth® module, a frequency modulated (FM) radio unit, a digital music player, a media player, a video game player module, an Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, a vehicle such as a car, truck, train, or airplane. The node 30 may connect to other components, modules, or systems of such apparatuses or devices via one or more interconnect interfaces, such as an interconnect interface that may comprise one of the peripherals 52.

Figure 28:
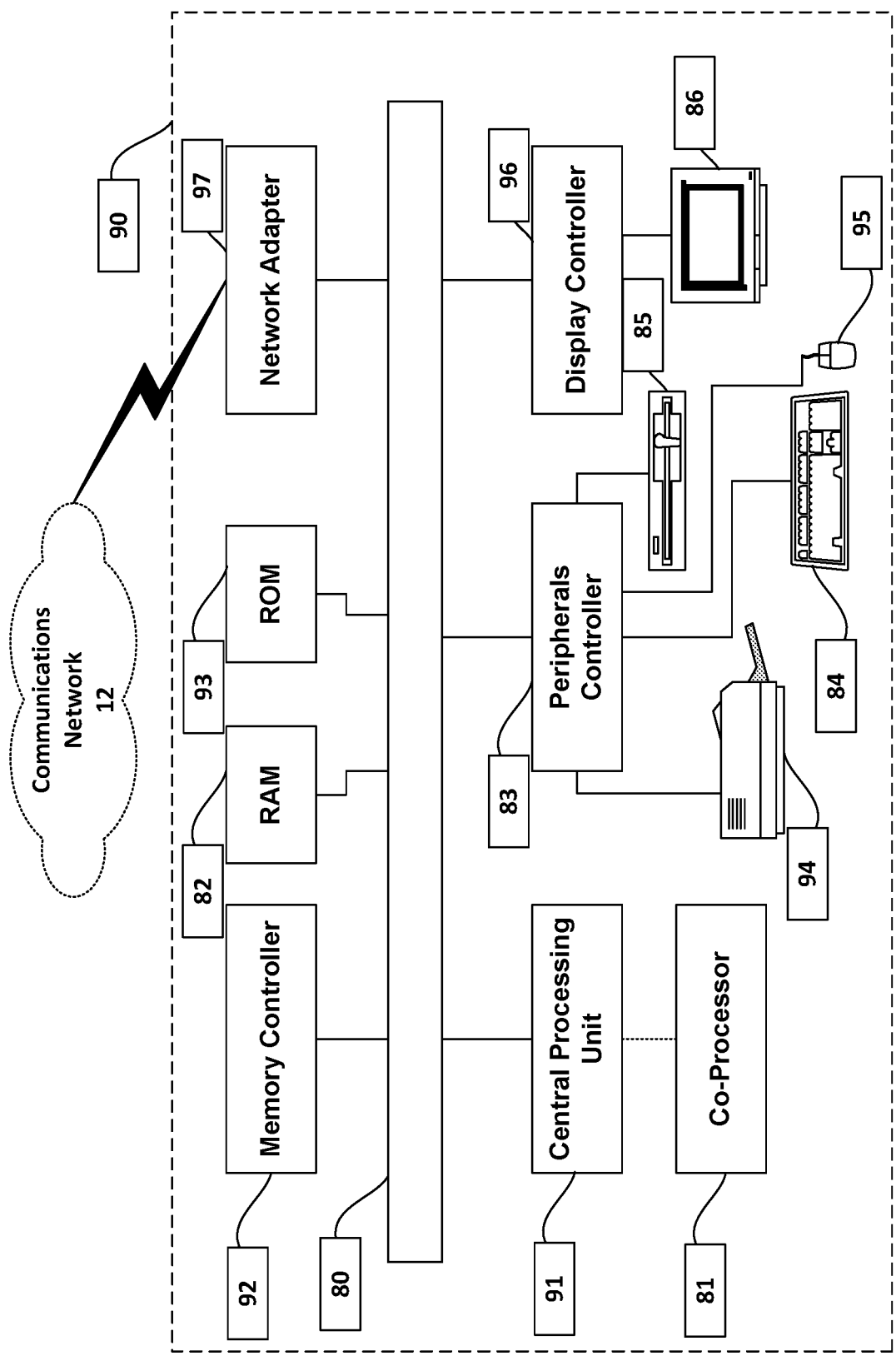
FIG. 28 is a block diagram of an example computing system in which a node of the communication system of FIGS. 25 and 26 may be embodied.

FIG. 28 is a block diagram of an exemplary computing system 90 which may also be used to implement one or more nodes of a network, such as the clients, servers, or proxies illustrated in FIG. 1-13, 16-17, or 20-28, which may operate as an M2M server, gateway, device, or other node in an M2M network such as that illustrated in FIG. 7, 9, 10, 20, 30, or 31. Computing system 90 may comprise a computer or server and may be controlled primarily by computer readable instructions, which may be in the form of software, wherever, or by whatever means such software is stored or accessed. Such computer readable instructions may be executed within a processor, such as central processing unit (CPU) 91, to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91, that performs additional functions or assists CPU 91. CPU 91 and/or coprocessor 81 may receive, generate, and process data related to the disclosed systems and methods for E2E M2M Service Layer sessions, such as receiving session credentials or authenticating based on session credentials.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memories coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode may access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain communication circuitry, such as for example a network adaptor 97, that may be used to connect computing system 90 to an external communications network, such as network 12 of FIGS. 25-28, to enable the computing system 90 to communicate with other nodes of the network. The communication circuitry, alone or in combination with the CPU 91, may be used to perform the multiple interface support steps herein, e.g., in relation to FIGS. 12, 14, 15, and 24, or in a claim.

FIGS. 1-4, 7-16, 21, and 24-28, the descriptions thereof, and the claims herein illustrate various embodiments of methods and apparatuses for enabling the initiation of a connection between two entities on behalf of a third entity. In these figures, various steps or operations are shown being performed by one or more clients, servers, and/or proxies. It is understood that the clients, servers, and proxies illustrated in these figures may represent logical entities in a communication network and may be implemented in the form of software (i.e., computer-executable instructions) stored in a memory of, and executing on a processor of, a node of such network, which may comprise one of the general architectures illustrated in FIG. 27 or 28 as described herein. That is, the methods illustrated in FIGS. 12, 14, 15, and 24 and the claims may be implemented in the form of software (i.e., computer-executable instructions) stored in a memory of a network node, such as for example the node or computer system illustrated in FIG. 25 or 26, which computer executable instructions, when executed by a processor of the node, perform the steps illustrated in the figures. It is also understood that any transmitting and receiving steps illustrated in these figures may be performed by communication circuitry (e.g., circuitry 34 or 97 of FIGS. 27 and 28 respectively) of the node under control of the processor of the node and the computer-executable instructions (e.g., software) that it executes.

It is understood that any or all of the systems, methods and processes described herein may be embodied in the form of computer executable instructions (i.e., program code) stored on a computer-readable storage medium which instructions, when executed by a machine, such as a node of an M2M network, including for example an M2M server, gateway, device or the like, perform and/or implement the systems, methods and processes described herein. Specifically, any of the steps, operations or functions described above may be implemented in the form of such computer executable instructions. Computer readable storage media include volatile and nonvolatile media, and removable and non-removable media implemented in any non-transitory (i.e., tangible or physical) method or technology for storage of information, but such computer readable storage media do not include signals. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible or physical medium which may be used to store the desired information and which may be accessed by a computer.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have elements that do not differ from the literal language of the claims, or if they include equivalent elements with insubstantial differences from the literal language of the claims.

We claim:

1. A first apparatus comprising a processor, a memory, and communication circuitry, the first apparatus forming a Machine-to-Machine, M2M, device being connected to an M2M communications network via its communication circuitry, the first apparatus further comprising computer-executable instructions stored in the memory of the first apparatus which, when executed by the processor of the first apparatus, cause the first apparatus to:
    manage a set of point-of-contact information of one or more M2M terminal devices, M2M applications, or M2M gateway entities at an M2M service layer, including a first entity residing on the first apparatus, the service layer providing service capabilities between an application layer and a network communication layer, the set of point-of-contact information comprising, for each included entity, a service layer level identifier, a service layer context, an address, a list of interfaces, and a set of interface selection preferences; and
    facilitate communications between the first entity and a second entity residing on a second apparatus, via selection of a preferred interface in accordance with the set of point-of-contact information for the first entity, wherein the set of point-of-contact information of one or more entities comprises point-of-contact information for the second entity; and
    resolve the selection of the preferred interface in accordance with the interface selection preferences of the first entity and the second entity, wherein the selection of the preferred interface is further based on the service layer level identifier and the service layer context of both the first entity and the second entity, whereby communications between the first entity and the second entity are facilitated according to the resolved selection.

2. The first apparatus of claim 1, wherein the computer-executable instructions further cause the first apparatus to obtain a set of interface preferences associated with an entity from a user via a graphical user interface.

3. The first apparatus of claim 1, wherein the computer-executable instructions further cause the first apparatus to derive a set of interface preferences associated with an entity at least in part from a set of policies.

4. The first apparatus of claim 1, wherein the computer-executable instructions further cause the first apparatus to distribute the set of point-of-contact information to the second apparatus.

5. The first apparatus of claim 1, wherein the computer-executable instructions further cause the first apparatus to send a message to a next hop apparatus, the message comprising an interface type parameter to be used for forwarding the message.

6. The first apparatus of claim 1, wherein the computer-executable instructions further cause the first apparatus to maintain a list comprising, for one or more listed interfaces, an activity status and a next hop reachable via the listed interface, and an interface scope, the interface scope comprising addresses of reachable entities associated with the listed interface.

7. The first apparatus of claim 6, wherein the computer-executable instructions further cause the first apparatus to:
    receive a message addressed for delivery to a destination address,
    if the destination address resolves to an interface scope, select the interface with the destination address in scope; and
    facilitate communication of the message to the destination address via the selected interface.

8. The first apparatus of claim 1, wherein the computer-executable instructions further cause the first apparatus to:
    receive a message addressed for delivery to a destination address, the message comprising an interface type parameter to be used for forwarding the message; and
    facilitate communication of the message to the destination address based on the interface type parameter.

9. The first apparatus of claim 1, wherein the computer-executable instructions further cause the first apparatus to maintain a neighbor access table comprising, for one or more listed interfaces, an Internet Protocol, IP, address of a neighbor entity resolved via the listed interface, and a set of preferences for the use of the listed interface.

10. A second apparatus comprising a processor, a memory, and communication circuitry, the second apparatus forming a Machine-to-Machine, M2M device being connected to a first apparatus via an M2M communications network using the communication circuitry, the second apparatus further comprising computer-executable instructions stored in the memory of the second apparatus which, when executed by the processor of the apparatus, cause the apparatus to:
    obtain, from the first apparatus, a set of point-of-contact information of one or more M2M terminal devices, M2M applications, or M2M gateway entities at an M2M service layer, including a first entity residing on the first apparatus at an M2M Service Layer (22), the service layer providing service capabilities between an application layer and a network communication layer, the set of point-of-contact information comprising, for each included entity, a service layer level identifier, a service layer context, an address, a list of interfaces, and a set of interface selection preferences, and
    select a preferred interface for communications between a second entity residing on the second apparatus and the first entity in accordance with the set of point-of-contact information of the first entity, wherein the set of point-of-contact information of the one or more entities comprises point-of-contact information for the second entity, and wherein the selection of the preferred interface is based on the service layer level identifier and the service layer context of both the first entity and the second entity.

11. A method performed by a first apparatus, the first apparatus forming a Machine-to-Machine, M2M, device, the method comprising:
managing a set of point-of-contact information of one or more M2M terminal devices, M2M applications or M2M gateway entities at an M2M service layer including a first entity residing on the first apparatus, the service layer providing service capabilities between an application layer and a network communication layer the set of point-of-contact information comprising for each included entity a service layer level identifier, a service layer context, an address, a list of interfaces, and a set of interface selection preferences;
facilitating communications between the first entity and a second entity residing on a second apparatus, via selection of a preferred interface in accordance with the set of point-of-contact information for the first entity, wherein the set of point-of-contact information of one or more entities comprises point-of-contact information for the second entity; and
resolving the selection of the preferred interface in accordance with the interface selection preferences of the first entity and the second entity, wherein the selection of the preferred interface is further based on the service layer level identifier and the service layer context of both the first entity and the second entity, whereby communications between the first entity and the second entity are facilitated according to the resolved selection.

12. The method of claim 11, further comprising, obtaining a set of interface preferences associated with an entity from a user via a graphical user interface.

13. The method of claim 11, further comprising, deriving a set of interface preferences associated with an entity at least in part from a set of policies.

14. The method of claim 11, further comprising, distributing the set of point-of-contact information to the second apparatus.

15. The method of claim 11, further comprising, sending a message to a next hop apparatus, the message comprising an interface type parameter to be used for forwarding the message.

16. The method of claim 11, further comprising, maintaining a list comprising, for one or more listed interfaces, an activity status and a next hop reachable via the listed interface and an interface scope, the interface scope comprising addresses of reachable entities associated with the listed interface.

17. The first apparatus of claim 16, further comprising:
receiving a message addressed for delivery to a destination address,
if the destination address resolves to an interface scope, selecting the interface with the destination address in scope; and
facilitating communication of the message to the destination address via the selected interface.

18. The method of claim 11, further comprising:
receiving a message addressed for delivery to a destination address, the message comprising an interface type parameter to be used for forwarding the message; and
facilitating communication of the message to the destination address based on the interface type parameter.

* * * * *